United States Patent
Oh et al.

(10) Patent No.: US 10,863,215 B2
(45) Date of Patent: Dec. 8, 2020

(54) CONTENT PROVIDING APPARATUS, METHOD OF CONTROLLING THE SAME, AND RECORDING MEDIUM THEREOF

(71) Applicant: SAMSUNG ELECTRONICS CO., LTD., Suwon-si (KR)

(72) Inventors: Sung-bo Oh, Seoul (KR); Byoung-jin Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/183,801

(22) Filed: Nov. 8, 2018

(65) Prior Publication Data
US 2019/0149858 A1    May 16, 2019

(30) Foreign Application Priority Data
Nov. 15, 2017   (KR) .................. 10-2017-0152122

(51) Int. Cl.
*H04N 21/236* (2011.01)
*H04N 21/2387* (2011.01)
(Continued)

(52) U.S. Cl.
CPC ....... *H04N 21/23614* (2013.01); *G06T 5/009* (2013.01); *H04N 5/765* (2013.01); *H04N 21/2387* (2013.01); *G06T 2207/10016* (2013.01)

(58) Field of Classification Search
CPC .. H04N 21/84; H04N 21/845; H04N 21/8453; H04N 21/8543; H04N 21/2343;
(Continued)

(56) References Cited

U.S. PATENT DOCUMENTS 6,631,240 B1 * 10/2003 Salesin ............... G06T 9/40
                                            348/E7.071
7,075,683 B1 *  7/2006 Shiiyama ........... G11B 27/031
                                            358/452
(Continued)

FOREIGN PATENT DOCUMENTS

CN        101082992 A    12/2007
CN        105469375 A     4/2016
(Continued)

OTHER PUBLICATIONS

Communication dated Jan. 18, 2019, issued by the European Patent Office in counterpart European Patent Application No. 18206261.2.
(Continued)

*Primary Examiner* — Pankaj Kumar
*Assistant Examiner* — Timothy R Newlin
(74) *Attorney, Agent, or Firm* — Sughrue Mion, PLLC

(57) ABSTRACT

Disclosed are a content providing apparatus, a method of controlling the same, and a recording medium thereof, the content providing apparatus including: a transmitter configured to transmit data to a display apparatus; and a processor configured to control the transmitter to transmit content data and additional data, relating to image attributes of the content data and having a fixed value corresponding to at least one section, among a plurality of sections of the content data, to the display apparatus based on a command received from a user to playback image content at a predetermined speed. Thus, it is possible to solve a problem of flickering or an error in brightness of a screen at a variable-speed playback of dynamic HDR content.

20 Claims, 14 Drawing Sheets

(51) Int. Cl.
*G06T 5/00* (2006.01)
*H04N 5/765* (2006.01)

(58) Field of Classification Search
CPC ....... H04N 21/234363; H04N 21/2144; H04N 21/44; H04N 21/4402; H04N 21/440218; H04N 21/440245; H04N 21/440263
See application file for complete search history.

(56) References Cited

U.S. PATENT DOCUMENTS

| | | | |
|---|---|---|---|
| 9,106,802 B2* | 8/2015 | Takashima | H04N 7/17318 |
| 2003/0078930 A1* | 4/2003 | Surcouf | G11B 27/005 |
| 2005/0018784 A1* | 1/2005 | Kurobe | H04L 1/0003 |
| | | | 375/260 |
| 2005/0041960 A1* | 2/2005 | Oh | G09G 5/006 |
| | | | 386/230 |
| 2006/0109856 A1* | 5/2006 | Deshpande | H04L 29/06027 |
| | | | 370/412 |
| 2007/0025688 A1* | 2/2007 | Pejhan | H04N 5/783 |
| | | | 386/344 |
| 2007/0140647 A1* | 6/2007 | Kusunoki | H04N 7/17318 |
| | | | 386/344 |
| 2008/0115176 A1* | 5/2008 | Rodriguez | H04N 21/23424 |
| | | | 725/89 |
| 2008/0120637 A1 | 5/2008 | Deiss | |
| 2010/0166068 A1* | 7/2010 | Perlman | A63F 13/86 |
| | | | 375/240.12 |
| 2011/0090959 A1* | 4/2011 | Wiegand | H04N 19/593 |
| | | | 375/240.12 |
| 2011/0116772 A1* | 5/2011 | Kwon | H04N 21/23439 |
| | | | 386/343 |
| 2011/0235713 A1* | 9/2011 | Hsieh | H04N 21/234363 |
| | | | 375/240.16 |
| 2012/0210216 A1* | 8/2012 | Hurst | H04N 5/783 |
| | | | 715/716 |
| 2013/0031266 A1 | 1/2013 | Gilson | |
| 2013/0129317 A1* | 5/2013 | Moorer | H04N 21/23424 |
| | | | 386/241 |
| 2013/0311670 A1* | 11/2013 | Tarbox | H04N 21/2387 |
| | | | 709/231 |
| 2014/0068789 A1* | 3/2014 | Watts | H04W 12/08 |
| | | | 726/29 |
| 2014/0189139 A1* | 7/2014 | Cheng | H04L 65/60 |
| | | | 709/231 |
| 2014/0258552 A1* | 9/2014 | Oyman | H04N 19/146 |
| | | | 709/231 |
| 2014/0344882 A1* | 11/2014 | Shahmoon | H04N 21/2662 |
| | | | 725/116 |
| 2015/0245043 A1 | 8/2015 | Greenebaum et al. | |
| 2015/0256860 A1 | 9/2015 | Kunkel et al. | |
| 2015/0373383 A1* | 12/2015 | Pichumani | H04N 21/234381 |
| | | | 725/90 |
| 2016/0007036 A1* | 1/2016 | Hsieh | H04N 21/234363 |
| | | | 375/240.02 |
| 2016/0065900 A1 | 3/2016 | Liu | |
| 2016/0134945 A1* | 5/2016 | Gower | H04N 21/234345 |
| | | | 725/88 |
| 2016/0254028 A1 | 9/2016 | Atkins et al. | |
| 2016/0294910 A1* | 10/2016 | Li | H04L 65/1083 |
| 2016/0323609 A1 | 11/2016 | Yoon et al. | |
| 2016/0330513 A1 | 11/2016 | Toma et al. | |
| 2017/0062005 A1 | 3/2017 | Kolesnikov et al. | |
| 2018/0220101 A1* | 8/2018 | Evans | H04N 7/0117 |

FOREIGN PATENT DOCUMENTS

| | | |
|---|---|---|
| EP | 2819414 A2 | 12/2014 |
| EP | 3168809 A1 | 5/2017 |
| EP | 3198556 A1 | 8/2017 |
| WO | 2014/176019 A1 | 10/2014 |
| WO | 2015/017314 A1 | 2/2015 |

OTHER PUBLICATIONS

Search Report dated Mar. 11, 2019, issued by the International Searching Authority in counterpart International Patent Application No. PCT/KR2018/013899 (PCT/ISA/210).

Written Opinion dated Mar. 11, 2019, issued by the International Searching Authority in counterpart International Patent Application No. PCT/KR2018/013899 (PCT/ISA/237).

Communication dated Feb. 21, 2020, issued by the European Patent Office in counterpart European Application No. 18 206 261.2.

Chinese Office Action issued in Chinese Application No. 201811357571.5; dated Oct. 12, 2020.

* cited by examiner

CONTENT PROVIDING APPARATUS, METHOD OF CONTROLLING THE SAME, AND RECORDING MEDIUM THEREOF

CROSS-REFERENCE TO RELATED APPLICATION

This application is based on and claims priority under 35 U.S.C. § 119 to Korean Patent Application No. 10-2017-0152122 filed on Nov. 15, 2017, in the Korean Intellectual Property Office, the disclosure of which is incorporated by reference herein in its entirety.

BACKGROUND

1. Field

The disclosure relates to a content providing apparatus, a method of controlling the same and a recording medium thereof, and more particularly to a content providing apparatus capable of processing an image to be displayed with enhanced contrast, a method of controlling the same, and a recording medium thereof.

2. Description of the Related Art

A display apparatus such as a television (TV) processes a signal or data of content through image processing, and displays an image on a screen of a display panel. The display apparatus receives image data from a content storage device such as an optical disc player, a relaying device such as a set-top box, etc., or through an interface such as a high definition multimedia interface (HDMI).

As performance of an image capturing device such as a camera, etc., increases with development of technology, the amount of information additional to the image data in units of frame has rapidly increased. For example, there is high-brightness image content such as high dynamic range (HDR) content.

When the HDR content is displayed in a predetermined reference monitor, the color gamut and brightness of the reference monitor are taken into account to create the HDR content. However, when the HDR content is displayed on the display apparatus, a brightness range supported in the display apparatus may be different from a brightness range of the content. Therefore, tone mapping is performed to account for the difference when the display apparatus displays the HDR content.

The HDR content includes content data and metadata as information additional for the tone mapping. The display apparatus performs the tone mapping based on the metadata, so that an image of the HDR content can have a brightness range supported in the display apparatus.

The metadata may be static metadata having an invariable value throughout the whole content, or dynamic metadata having a value, which varies depending on scenes.

However, when the HDR content including the dynamic metadata is played back in the display apparatus at a fast speed, a real-time processing of the metadata that is dynamically varied across multiple frames depending on a scene transition may not keep up with the playback speed.

Accordingly, the load of the display apparatus, i.e. the processing load is increased, and the content data and the metadata may be not synchronized. Further, asynchronization between the metadata and the content data may cause a flickering image or abnormal change in brightness on a screen, thereby making a user experience visual discomfort.

SUMMARY

In accordance with an aspect of the disclosure there is provided a content providing apparatus comprising: a transmitter configured to transmit data to a display apparatus; and a processor configured to control the transmitter to transmit content data and additional data, relating to image attributes of the content data and having a fixed value corresponding to at least one section, among a plurality of sections of the content data, to the display apparatus based on a command received from a user to playback image content at a predetermined speed.

The additional data may comprise data having the fixed value in the plurality of sections of the content data.

The additional data corresponding to a current section, among a plurality of sections of the content data, may comprise data having a value corresponding to a previous section, among the plurality of sections of the content data.

The additional data may comprise identification information for indicating a playback speed of the content data.

The additional data maybe configured to cause the display apparatus to perform a second compensatory process having a processing load less than a first compensatory process on the content data.

The additional data may comprise information corresponding to the second compensatory process.

The first compensatory process may comprise a dynamic compensatory process, and the second compensatory process comprises a static compensatory process.

The display apparatus, to which the additional data is transmitted, may perform a first compensatory process or a second compensatory process having a processing load less than the first compensatory process according to a plurality of sections of the content data, and the additional data may comprise one of first information corresponding to the first compensatory process and second information corresponding to the second compensatory process according to the plurality of sections of the content data.

The first compensatory process may comprise a dynamic compensatory process, and the second compensatory process comprises a static compensatory process.

The additional data may comprise metadata for tone mapping of the content data.

In accordance with another aspect of the disclosure there is provided a method of controlling a content providing apparatus, comprising: receiving a command to playback image content at a predetermined speed; and transmitting content data and additional data, relating to image attributes of the content data and having a fixed value corresponding to at least one section, among a plurality of sections of the content data, to a display apparatus based on receiving the command to playback the image content at the predetermined speed.

The additional data corresponding to a current section, among a plurality of sections of the content data, may comprise data having a value corresponding to a previous section, among the plurality of sections of the content data.

The additional data may comprise identification information for indicating a playback speed of the content data.

The method of controlling the content providing apparatus may further comprise: performing, by the display apparatus to which the additional data is transmitted, a second compensatory process having a processing load less than a first compensatory process on the content data.

The additional data may comprise information corresponding to the second compensatory process.

The first compensatory process may comprise a dynamic compensatory process, and the second compensatory process comprises a static compensatory process.

The method of controlling the content providing apparatus may further comprise: performing, by the display apparatus to which the additional data is transmitted, a first compensatory process or a second compensatory process having a processing load less than the first compensatory process according to a plurality of sections of the content data, wherein the transmitted additional data may comprise one of first information corresponding to the first compensatory process and second information corresponding to the second compensatory process according to the plurality of sections of the content data.

The first compensatory process may comprise a dynamic compensatory process, and the second compensatory process comprises a static compensatory process.

The additional data may comprise metadata for tone mapping of the content data.

In accordance with another aspect of the disclosure there is provided a nonvolatile computer-readable recording medium, in which a program of a method executable by a processor of a content providing apparatus is recorded, the method comprising: receiving a command to playback image content at a predetermined speed; and transmitting content data and additional data, relating to image attributes of the content data and having a fixed value corresponding to at least one section, among a plurality of sections of the content data, to a display apparatus based on receiving the command to playback the image content at the predetermined speed.

In accordance with another aspect of the disclosure there is provided a content providing apparatus comprising: at least one processor configured to: receive an instruction to reproduce multimedia content at a first speed, the multimedia content comprising additional data; determine whether the first speed is greater than a reference speed, the reference speed being equal to greater than a normal reproducing speed of the multimedia content; change a value in the additional data corresponding to multimedia content; and transmit the multimedia content and the changed additional data to a display apparatus.

The at least one processor maybe further configured to change a value of the additional data corresponding to a current section, among a plurality of sections of the content data, by replacing the value of the additional value corresponding to the current section with a value corresponding to a previous section, among the plurality of sections of the content data.

The at least one processor maybe further configured to change the value of the additional data to a default value for instructing the display apparatus to apply a default compensatory processing of the display apparatus during the multimedia content processing.

The at least one processor may further configured to change the value of the additional data from a dynamic value to a fixed value.

In accordance with another aspect of the disclosure there is provided a display apparatus comprising: at least one processor configured to: receive multimedia content from a content providing apparatus; extracting additional data from the multimedia content, the additional data based on a playback speed of the multimedia content; determine whether the additional data has a predetermined format; perform a static compensatory process on the multimedia data based on a determination that the additional data has the predetermined format; perform a dynamic compensatory process on the multimedia data based on a determination that the additional data does not have the predetermined format; and display the multimedia content based on the static compensatory process or the dynamic compensatory process.

The additional data corresponding to a current section, among a plurality of sections of the content data, comprises data having a value corresponding to a previous section, among the plurality of sections of the content data.

The value of the additional data may comprise a default value, which instructs the display apparatus to apply a default compensatory processing of the display apparatus during the multimedia content processing.

The value of the additional data maybe changed from a dynamic value to a fixed value.

In accordance with another aspect of the disclosure there is provided a display apparatus comprising: at least one processor configured to: receive an instruction to play multimedia content at a first speed; determine whether the first speed is greater than a reference speed, the reference speed being equal to greater than a normal reproducing speed of the multimedia content; change a value in additional data corresponding to the multimedia content, and display the multimedia content based on changed additional data.

BRIEF DESCRIPTION OF THE DRAWINGS

The above and/or other aspects will become apparent and more readily appreciated from the following description of embodiments, taken in conjunction with the accompanying drawings, in which.

DETAILED DESCRIPTION OF EMBODIMENTS

Below, embodiments will be described in detail with reference to accompanying drawings. Further, the descriptions of the embodiments will be made with matters illustrated in the accompanying drawings, in which like numerals or symbols refer to like elements having substantially the same function.

In addition, at least one among a plurality of elements in the present disclosure represents not only all the elements but also each one of the elements, which precludes the other elements, or all combinations of the elements.

Figure 1:
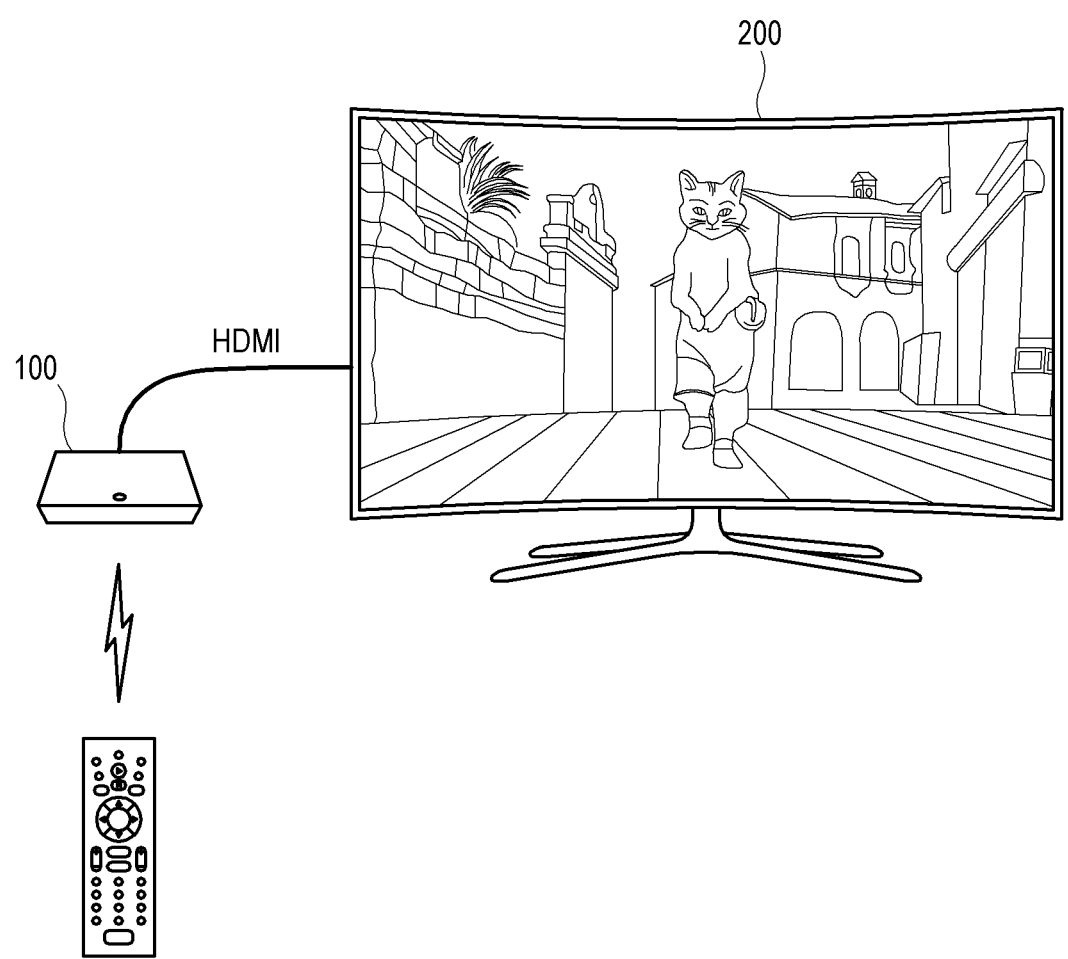
FIG. 1 illustrates an example of a system including a content providing apparatus and a display apparatus according to an embodiment.

FIG. 1 illustrates a system including a content providing apparatus and a display apparatus according to one embodiment.

As shown in FIG. 1, a display apparatus 200 is connected to a content providing apparatus 100, processes data output from the content providing apparatus 100, and displays an image based on the processed data. According to one embodiment, the content providing apparatus 100 serves as a source device, and the display apparatus 200 serves as a sink device. The content providing apparatus 100 may be provided as a player for reproducing content in the display apparatus 200.

The content providing apparatus 100 and the display apparatus 200 may be connected through various interfaces of wired and wireless standards. According to the embodiment in FIG. 1, a high-definition multimedia interface (HDMI) is provided for connecting the content providing apparatus 100 and the display apparatus 200. However, various other interfaces are also possible according to other embodiments.

According to an embodiment, the display apparatus 200 may be a television (TV) that processes a broadcast image based on a broadcast signal, broadcast information or broadcast data received from a transmitter of a broadcasting station. The broadcast signal received in the display apparatus 200 may be received through a terrestrial wave, a cable, a satellite, etc., and a signal source in this embodiment is not limited to the broadcasting station. That is, any apparatus or station capable of transmitting and receiving data may be included in the signal source according to the embodiment.

Further, the display apparatus 200 may receive an image signal from various types of external apparatus including the content providing apparatus 100. Further, the display apparatus 200 may process a signal to be displayed on a screen as a moving image, a still image, an application, an on-screen display (OSD), a user interface (UI) for controlling various operations, etc. based on a signal/data stored in an internal/external storage medium.

According to an embodiment, the display apparatus 200 may be a smart TV or an Internet protocol (IP) TV. The smart TV refers to a TV that can receive and display a broadcast signal in real time, support a web browsing function so that various pieces of content can be searched and consumed through the Internet while a broadcast signal is displayed in real time, and provide a convenient user environment for the web browsing function. Further, the smart TV includes an open software platform to provide an interactive service to a user. Therefore, the smart TV is capable of providing various pieces of content, for example, an application for a predetermined service to a user through the open software platform. Such an application refers to an application program for providing various kinds of services, for example, a social network service (SNS), finance, news, weather, a map, music, a movie, a game, an electronic book, etc.

However, the concept of the embodiments are not limited to the foregoing examples of the display apparatus 200, and thus the display apparatus 200 may be applied to various kinds of examples capable of processing an image, such as a monitor connected to a computer, etc. as well as the TV.

The content providing apparatus 100 includes a player for an optical disc such as a Blu-ray disc (BD), a digital versatile disc (DVD), etc., an audio/video (AV) receiver, a set-top box, a streaming device, and the like for playing back or relaying content.

According to an embodiment, when the content providing apparatus 100 generates a transition minimized display signaling (TMDS) content signal by playing back content and transmits the content signal to the display apparatus 200 through an HDMI cable, the display apparatus 200 processes the received content signal under an image processing process and displays an image corresponding to the content on a display. The image processing process may be given in various forms or combinations according to formats of a content signal, for example, demultiplexing, decoding, descrambling, detail enhancement, scaling, etc.

On the assumption that content is displayed on a predetermined reference monitor, the content is created considering the color gamut and brightness of the reference monitor. When the content is high dynamic range (HDR) image content, the content has a wider brightness range and represents a finer image than general image content and image. According to an embodiment, the image content is a multimedia content, including but not limited to pictures and moving pictures (i.e., video content).

However, when the brightness range supported in the display apparatus 200 is different from the brightness range of the HDR content, tone mapping is performed to make up for the difference and then display the content on the display apparatus 200.

Figure 2:
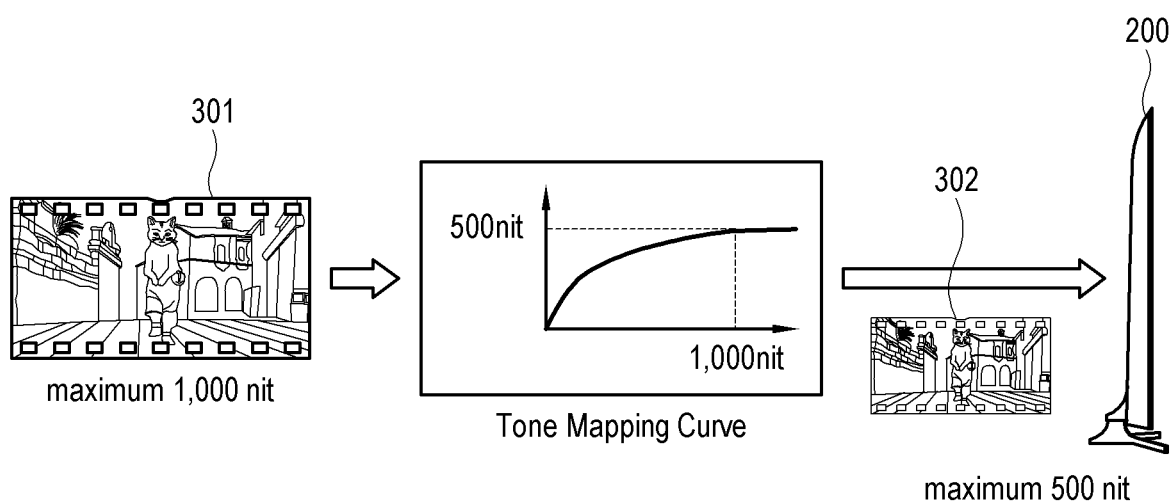
FIGS. 2 to 4 are views for explaining tone mapping in a display apparatus according to an embodiment.
Figure 3:
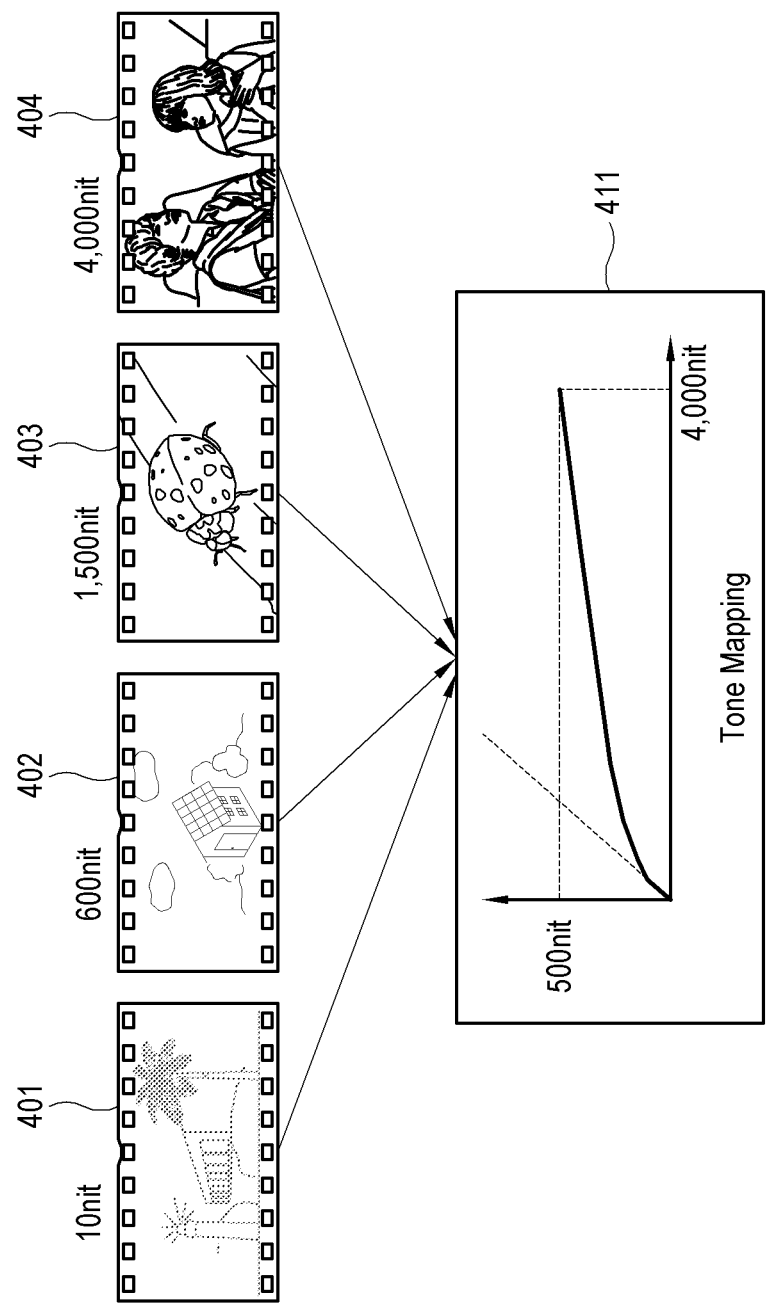
Figure 4:
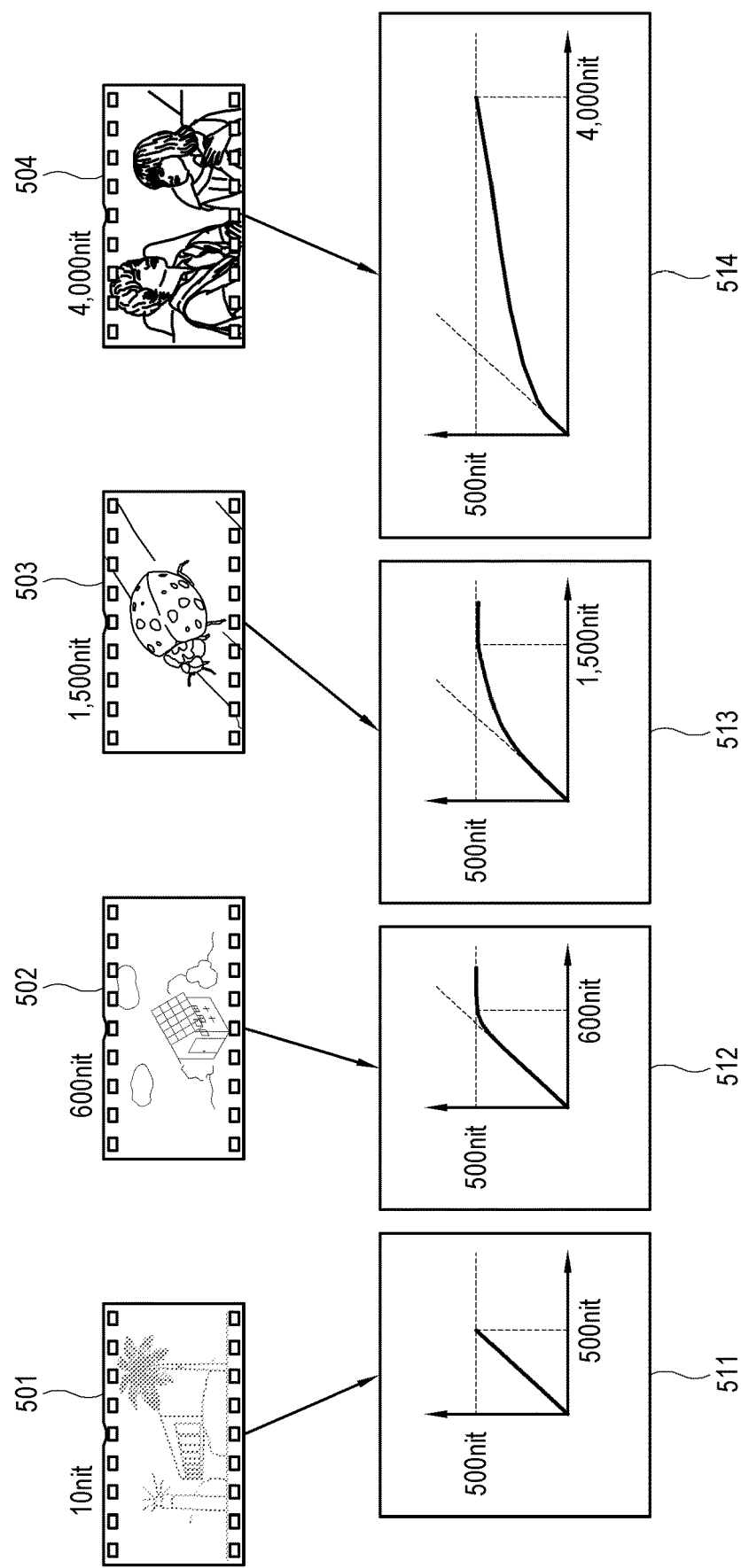

FIGS. 2 to 4 are views for explaining tone mapping in a display apparatus according to an embodiment.

As shown in FIG. 2, when HDR content 301 having the maximum brightness level of 1,000 nits is output to the display apparatus 200 supporting the maximum brightness level of 500 nits without changing the brightness level of the content, the display apparatus 200 cannot represent a brightness level higher than 500 nits. Thus, the display apparatus 200 according to an embodiment performs 1:1 tone mapping based on a tone mapping curve as shown in FIG. 2, thereby controlling HDR content 302, which is compensated for the brightness level suitable for the characteristics of the display apparatus 200, to be displayed on a screen.

The HDR content further includes not only content data corresponding to an image, but also image attributes of the content data, i.e., additional or additional data related to brightness that may be appended to the content data. The additional data includes metadata provided as information for the tone mapping.

The display apparatus 200 generates the tone mapping curve from the received metadata, and performs the tone mapping based on the tone mapping curve, thereby processing an image of HDR content to have a brightness range supported in the display apparatus 200.

The metadata may be static metadata having a fixed value throughout the whole content, or dynamic metadata having a variable value, which varies depending on scenes or frames. Here, the scene may include successive frames having similar image attributes. For example, dark night may be classified into one independent scene.

Hereinafter, HDR content having the static metadata will be called static HDR content, and HDR content having the dynamic metadata will be called dynamic HDR content.

The content is formed by grouping a plurality of scenes, and the scenes are different in a brightness range. That is, the maximum brightness in a dark scene at night may be lower than the maximum brightness in a brightness scene.

Referring to FIG. 3, four scenes 401, 402, 403 and 404 are illustrated according to an embodiment, in which the first scene 401 has the maximum brightness of 10 nits, the second scene 402 has the maximum brightness of 600 nits, the third scene 403 has the maximum brightness of 1500 nits and the fourth scene 404 has the maximum brightness of 4000 nits.

In a case of the static HDR content, as shown in FIG. 3, the display apparatus 200 generates one tone mapping curve 411 for the static metadata, and applies the tone mapping based on the same tone mapping curve 411 to all the scenes 401, 402, 403 and 404 of the content.

On the other hand, the dynamic HDR content is created to include metadata in units of scenes (or frames), i.e. metadata per predetermined section of the content data.

Referring to FIG. 4, four scenes 501, 502, 503 and 504 are illustrated according to an embodiment, in which the first scene 501 has the maximum brightness of 10 nits, the second scene 502 has the maximum brightness of 600 nits, the third scene 503 has the maximum brightness of 1500 nits and the fourth scene 504 has the maximum brightness of 4000 nits. The display apparatus 200 for displaying the dynamic HDR content generates a plurality of tone mapping curves 511, 512, 513 and 514 for the dynamic metadata corresponding to the respective scenes 511, 512, 513 and 514. Here, the tone mapping curve 514 corresponding to the fourth scene 504 and the like scene having high brightness has a low gradient.

According to an embodiment, to display the dynamic HDR content, the display apparatus 200 may generate the tone mapping curves corresponding to the scenes, and therefore needs a more complicated compensatory process than that for the static HDR content of FIG. 3. Here, the display apparatus 200 makes a bright scene brighter and a dark scene darker to enhance contrast, thereby providing a more realistic image.

As shown in FIG. 4, to display the dynamic HDR content, a display apparatus 500 performs the tone mapping based on the tone mapping curves 511, 512, 513 and 514 respectively corresponding to the scenes 501, 502, 503 and 504 of the content.

In displaying the dynamic HDR content, the display apparatus 200 according to an embodiment performs a first compensatory process (hereinafter, also referred to as a dynamic compensatory process or dynamic tone mapping) based on types of additional data, i.e. metadata received according to sections of content data, i.e. scenes; or a second compensatory process (hereinafter, also referred to as a static compensatory process or static tone mapping) of which processing load, i.e. real-time throughput is lower than that of the first compensatory process.

The type of additional data or additional data may be previously set to match with a general playback (or a normal playback) of content, or a playback faster than a predetermined speed, e.g. a variable-speed playback of content.

Specifically, the additional data may include dynamic metadata as information corresponding to the first compensatory process. According to the sections (i.e. the scenes) of the content data, the display apparatus 200 performs the first compensatory process, i.e. the dynamic tone mapping based on the dynamic metadata with regard to the sections including the dynamic metadata, and performs the second compensatory process, i.e. the static tone mapping with regard to the sections including no dynamic metadata (e.g. sections including metadata assigned with an abnormal value of 0). Here, the second compensatory process is performed based on reference data stored in the display apparatus 100.

Further, the additional data may include the dynamic metadata or the static metadata corresponding to the sections of the content data, as information corresponding to each of the first and second compensatory processes. The display apparatus 200 performs the first compensatory process with regard to the sections including the dynamic metadata, and performs the second compensatory process with regard to the sections including the static metadata. Here, the static metadata may be given to not update the metadata of the previous section (or scene) with that of the current scene, but retain the metadata of the previous scene as it is. In this case, the second compensatory process is performed based on the additional data corresponding to the previous section.

Further, the additional data may further include identification information about a playback speed of content data. The display apparatus 200 may determine whether the content data corresponds to a general playback or a variable-speed playback on the basis of the identification information included in the received additional data, thereby performing the first compensatory process in a general playback section and the second compensatory process according to the determination results.

The foregoing operations of performing the first or second compensatory process according to the sections based on the type of additional data will be described in more detail through the following embodiments.

Below, the configurations of the content providing apparatus and the display apparatus according to an embodiment will be described with reference to the accompanying drawings.

Figure 5:
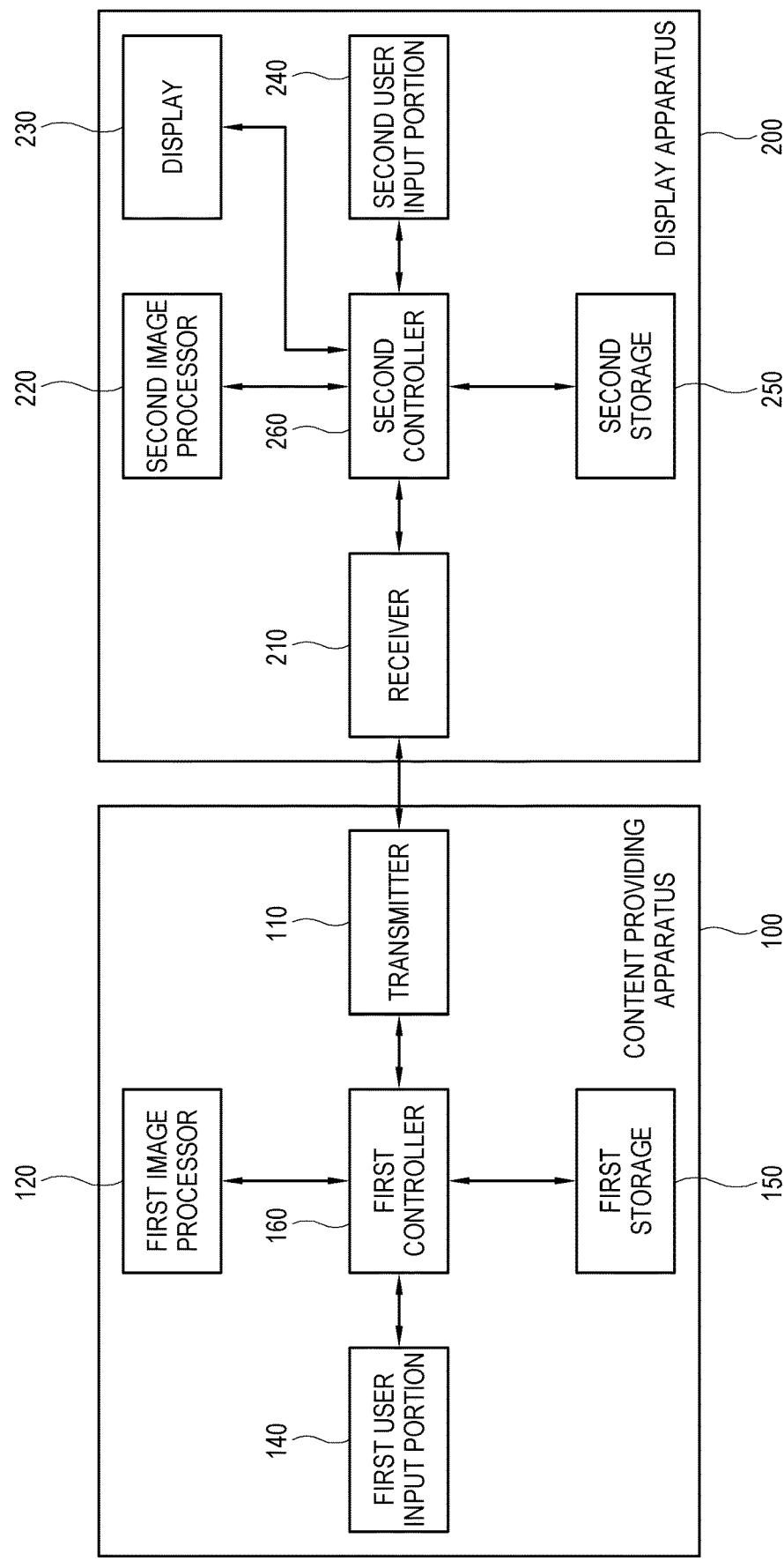
FIG. 5 is a block diagram of a content providing apparatus and a display apparatus according to an embodiment.

FIG. 5 is a block diagram of a content providing apparatus and a display apparatus according to an embodiment.

As shown in FIG. 5, the content providing apparatus 100 includes a transmitter 110, a first image processor 120, a first user input portion 140, a first storage 150, and a first controller 160.

The transmitter 110 transmits a content signal to the display apparatus 200. The transmitter 110 refers to a communication circuit that includes a data input/output interface corresponding to combination of communication modules, ports, etc., according to one or more of various communication protocols. The transmitter 110 basically transmits a content signal to the display apparatus 200, but may be interactively provided to transmit and receive a signal. According to an embodiment, the transmitter 110 maybe connected to the display apparatus 200 through an HDMI cable, but a connection method is not limited to the HDMI cable.

The first image processor 120 performs various preset video/audio processing processes on a content signal to be output through the transmitter 110.

The first image processor 120 includes a decoder for decoding an image signal to have an image format for the display apparatus 200, and a scaler for scaling the image signal according to the output standards of the display apparatus 200. According to another embodiment, the scaler may scale scaling the image signal according to the output characteristics of the display apparatus. Here, there are no limits to the kinds of image processing process performed in the first image processor according to the embodiment. For example, the first image processor 120 may further perform at least one among various processes such as resolution conversion, color change, color-space conversion, brightness control, noise reduction, etc.

According to an embodiment, the first image processor 120 decompresses HDR content into content data, i.e. audio and video signals, and extracts additional data, i.e. metadata during the decompression. In a case of the dynamic HDR content, the dynamic metadata is extracted according to the scenes of the content data.

The first image processor 120 performs an image process so that an image can be displayed at a speed corresponding to the general playback or the variable-speed playback of content.

The first image processor 120 may be materialized as each individual group for independently performing such a process, or as it is included in a system-on-chip (SoC) where various functions are integrated. A main SoC may include at least one microprocessor or central processing unit (CPU) as an example of the first controller 160 to be described later.

According to an embodiment, the first image processor 120 may be materialized by an image board including circuit elements such as various chipsets for performing respective processes, a memory, electronic parts, wirings, etc. are mounted on to a printed circuit board (PCB). In this case, the first image processor 120 and the first controller 160 of the content providing apparatus 100 may be provided on a single image board. Of course, this is merely an example, and the first image processor 120 and the first controller 160 of the content providing apparatus 100 may be arranged on a plurality of PCBs connecting and communicating with each other.

The first user input portion 140 transmits various preset control commands or unrestricted information to the first controller 160 in response to a user's input.

The first user input portion 140 includes a keypad (or an input panel) including buttons such as a power key, a menu key, etc. provided in the main body of the content providing apparatus 100.

According to one embodiment, the first user input portion 140 includes an input unit for generating a preset command/data/information/signal previously set for remotely controlling the content providing apparatus 100 and transmitting it to the content providing apparatus 100. The input unit is provided separately from the main body of the content providing apparatus 100 like a remote controller and allows a user to make an input. The remote controller may be provided with a touch sensor for sensing a user's touch input and/or a motion sensor for sensing its own motion caused by a user. The input unit may include a terminal such as a smart phone, in which a remote-control application is installed. In this case, the input unit may receive a user's touch input through a touch screen.

The input unit serves as an external apparatus for wireless communication with the main body of the content providing apparatus 100, and the wireless communication includes Bluetooth, infrared communication, radio frequency communication, wireless local area network (WLAN), Wi-Fi direct, etc.

According to one embodiment, the first user input portion 140 may receive a user's input for requesting content to be played back at a speed higher than a predetermined speed, for example, a variable-speed playback command for 2×, 4×, 8×, 16× or the like speed. The variable-speed playback includes a chapter skip playback, a frame unit playback, etc.

According to one embodiment, the content providing apparatus 100 may switch over its operation mode from a general playback mode to a variable-speed playback mode in response to the variable-speed playback command from a user. When switching over to the variable-speed playback mode is sensed, the first image processor 120 processes an image to be played back on the display apparatus 200 at a playback speed corresponding to the variable-speed playback mode.

The first storage 150 is configured to store various pieces of data of the content providing apparatus 100. The first storage 150 may be materialized by a nonvolatile memory (e.g. a writable read only memory (ROM)) in which data is retained even though power supplied to the display apparatus 100 is cut off, and which writes and reflects changes. That is, the first storage 150 may be materialized by one of a flash memory, an erasable and programable read only memory (EPROM), or an electrically erasable and programmable read only memory (EEPROM). The first storage 150 may further include a volatile memory such as a dynamic random access memory (DRAM) or a static random access memory (SRAM), of which the reading or writing speed of the content providing apparatus 100 is faster than the nonvolatile memory.

Data stored in the first storage 150 may for example include not only an operating system for operating the content providing apparatus 100, but also various applications to be run on the operating system, image data, additional data, etc.

According to one embodiment, the first storage 150 includes an optical disc storage medium such as a Blu-ray disc, a DVD, and the like where image content is stored. The content providing apparatus 100 is provided with a disc loader to rotate an optical disc and read stored data when content is played back, thereby reading digital content from a rotating ultra-high definition (UHD) BD, BD, DVD, compact disc digital audio (CDDA), etc. with a laser.

In this embodiment, the term 'storage' is defined to include the first storage 150, the ROM in the first controller 160, the RAM, a memory card (for example, a micro secure digital (SD) card, and a memory stick) mountable to the content providing apparatus 100, or an optical disc storage medium.

The first controller 160 performs control for operating general elements of the content providing apparatus 100. The first controller 160 may include a control program (or instruction) for implementing such a control operation, a nonvolatile memory in which the control program is installed, a volatile memory in which at least a part of the installed control program is loaded, and at least one processor or CPU for executing the loaded control program.

The processor may include a single-core processor, a dual-core processor, a triple-core processor, a quad-core processor, and the like multiple-core processor. The processor may include a plurality of processors, for example, a main processor and a sub processor that operates in a sleep mode, e.g. when the content providing apparatus receives only standby power and does not fully operates. Further, the processor, the ROM and the RAM may be connected to one another via an internal bus. According to one embodiment, the processor may be achieved in the form of an SoC where the core processor and a graphic processing unit (GPU) are combined.

The processor, which is an example of the first controller 160 according to an embodiment, may be achieved as included in a main SoC mounted to a built-in PCB of the content providing apparatus 100. Alternatively, the main SoC may further include the first image processor 120.

The control program may include a program(s) achieved in the form of at least one among a basic input/output system (BIOS), a device driver, an operating system, a firmware, a platform, and an application. According to one embodiment, the application may be previously installed or stored in the content providing apparatus 100 when the content providing apparatus 100 is manufactured, or may be installed in the content providing apparatus 100 for use in the future on the basis of data received corresponding to the application from the outside. The data of the application may for example be downloaded from an external server such as an application market to the content providing apparatus 100. Such an external server is an example of a computer program product according to an embodiment, but not limited thereto.

According to one embodiment, the operations of the first controller 160 may be achieved by a computer program stored in the computer program product (not shown) provided separately from the content providing apparatus 100. In this case, the computer program product includes a memory where an instruction corresponding to the computer program is stored, and a processor. The instruction may be issued to include transmitting content data and additional data of a predetermined format to the display apparatus 200 when it is executed by the processor.

Thus, the content providing apparatus 100 downloads and executes the computer program stored in a separate computer program product, thereby performing the operations of the first controller 160.

The first controller 160 performs decoding about the HDR content including the content data and the additional data, and controls the first image processor 120 to obtain the decompressed content data and additional data. According to one embodiment, the first controller 160 may extract metadata from the decompressed additional data.

The first controller 160 transmits the HDR content processed by the first image processor 120 to the display apparatus 200 through the transmitter 110. Here, the first image processor 120 may process the HDR content in accordance with a playback speed (i.e. general playback or variable-speed playback) of the corresponding content.

The first controller 160 controls the transmitter 110 to transmit the dynamic HDR content including the additional data having a preset format to the display apparatus 200, in response to an event. According to an embodiment, the event may be a predetermined event. According to an embodiment, the event may be a variable-speed playback command received through the first user input portion 140. For example, the first controller 160 assigns a preset value, e.g. "0" to the dynamic metadata of the section (scene) corresponding to the variable-speed playback, and controls the transmitter 110 to transmit the HDR content including the dynamic metadata as the additional data to the display apparatus 200. According to another embodiment, the first controller 160 may assign a value of metadata from a previous section (scene) to dynamic metadata for a current section (scene) corresponding to the variable-speed playback, and transmit the HDR content including the metadata as the additional data. According to yet another embodiment, the first controller 160 may change and assign the dynamic metadata of the section (scene) corresponding to the variable-speed playback to be the value of the static metadata, and transmit the HDR content including the static metadata as the additional data.

According to an embodiment, when the variable-speed playback command is received while a predetermined scene is played back, the first controller 160 may immediately assign a preset value to the metadata corresponding to the content data for the corresponding scene. Further, when a command for returning from the variable-speed playback to the general playback is received while a predetermined scene is played back, the first controller 160 may immediately assign the original dynamic metadata value to the metadata corresponding to the content data for the corresponding scene.

According to another embodiment, when the variable-speed playback command is received while a predetermined scene is played back, the first controller 160 may assign a preset value to the metadata corresponding to the content data for the next scene. Further, when a command for returning from the variable-speed playback to the general playback is received while a predetermined scene is played back, the first controller 160 may assign the original dynamic metadata value from the metadata corresponding to the content data for the next scene.

Figure 6:
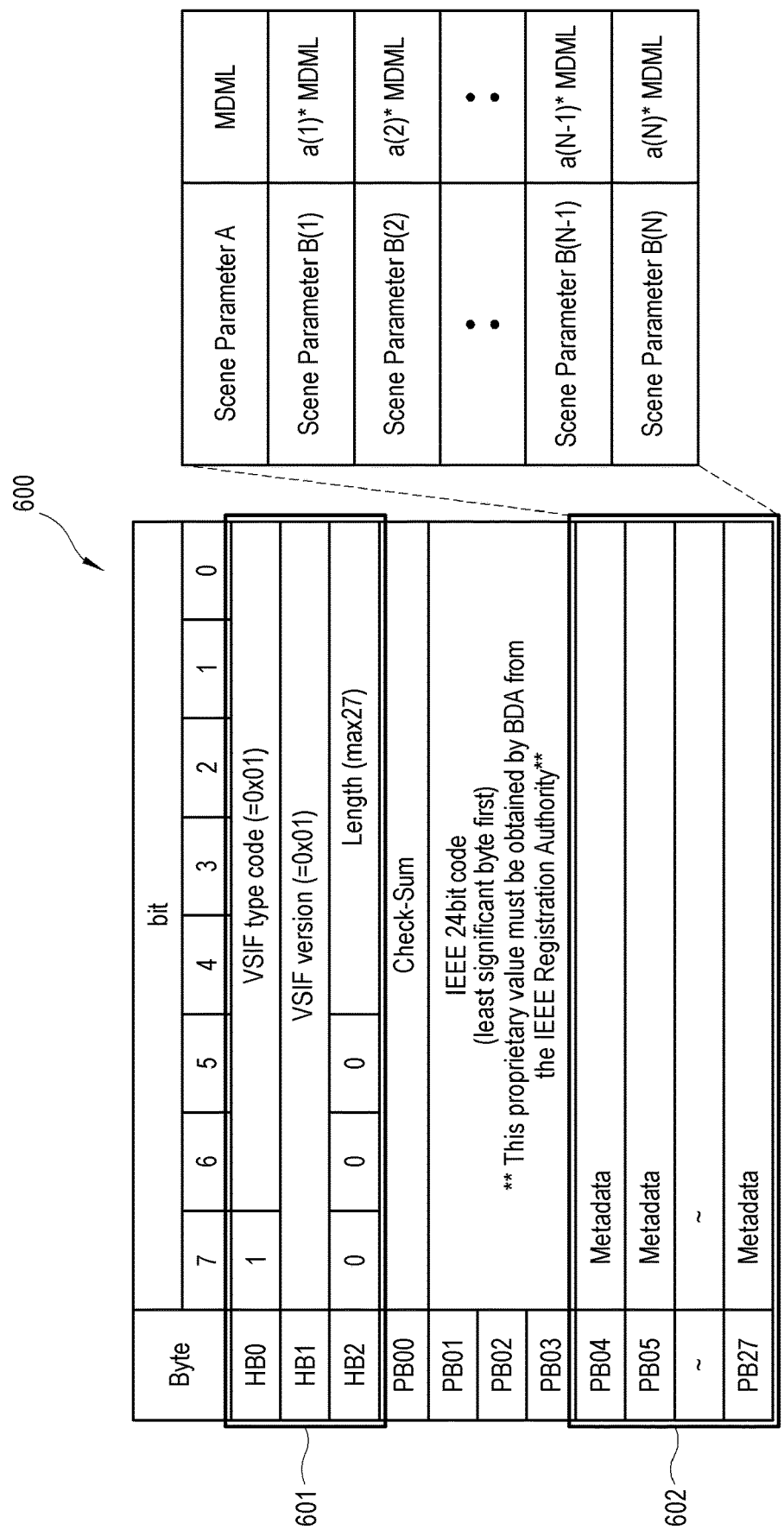
FIG. 6 illustrates an example of additional data included in high dynamic range (HDR) content according to an embodiment.

FIG. 6 illustrates an example of additional data included in HDR content according to an embodiment.

As shown in FIG. 6, additional data 600 includes descriptive information 601 about a predetermined scene, and attribute information 602 about the scene. The attribute information 602 refers to metadata having information about brightness, color gamut (color volume), etc., in which the maximum value among red, green, and blue (RGB) values of pixels included in one frame is obtained and accumulated in a histogram.

As shown in FIG. 6, the metadata includes a plurality of parameters having a predetermined value. For example, a scene parameter A may have the maximum brightness information (mastering display maximum luminance (MDML)) in the corresponding scene.

FIG. 6 shows the dynamic metadata by way of example, in which the dynamic metadata may be used in generating a tone mapping curve corresponding to the scene in the display apparatus 200.

According to an embodiment, when the variable-speed playback command is input through the first user input portion 140, the first controller 160 changes the metadata by assigning a preset value to each parameter of the metadata corresponding to the section, i.e. the scene played back at a variable speed, and transmits the changed metadata to the display apparatus 200. According to an embodiment, the first controller 160 may change the metadata by assigning "0" to each parameter of the metadata corresponding to the scene played back at a variable speed.

According to an embodiment, a specific bit of the additional data 600 is assigned as a flag for indicating whether it is the static metadata or the dynamic metadata. Such a value of the assigned bit is used as information corresponding to each of the first and second compensatory processes. According to an embodiment, when each parameter of the metadata is assigned a value of "0", and the compensatory process may be performed using not the additional data but a reference data autonomously provided in the display apparatus 200.

According to another embodiment, the additional data 600 may include both the static metadata and the dynamic metadata. In this case, some bits (i.e., first bits) of the additional data 600 maybe assigned to the static metadata, and some other bits (i.e., second bits) maybe assigned to the dynamic metadata. Accordingly, the first bits and the second bits are used as information corresponding to each of the first and second compensatory processes. The display apparatus 200 may selectively extract the static metadata or the dynamic metadata as necessary, thereby achieving tone mapping.

Meanwhile, according to an embodiment, a specific bit of the additional data 600 may be assigned as a flag for indicating a playback speed of content data, i.e. identifying whether it is the general playback and the variable-speed playback. In other words, when a user issues the variable-speed playback command, the content providing apparatus 100 may change a predetermined bit assigned as the flag in the additional data 600 to indicate the variable-speed playback (for example, switching over from "1" to "0").

According to another embodiment, the additional data 600 may include a value for indicating the playback speed of the content. Based on the received value, the display apparatus 200 determines whether the playback speed of the content is higher than a predetermined speed.

According to another embodiment, the additional data 600 may distinguishably show the playback speed of the content. For example, the additional data 600 may have various values respectively corresponding to 2×, 4×, 8×, and 16× playback speeds, and the display apparatus 200 determines the playback speed of the content based on the received value.

The display apparatus 200, as shown in FIG. 5, includes a receiver 210, a second image processor 220, a display 230, a second user input portion 240, a second storage 250, and a second controller 260.

The receiver 210 receives an image signal (i.e., content) from the content providing apparatus 100 and transmits the image signal (i.e., content) to the first image processor 120. The receiver 210 may be provided corresponding to the communication standards of the content providing apparatus 100, and for example, receive HDR content including the content data and the additional data according to HDMI standards.

However, the present disclosure is not limited to the HDMI standard. For example, the signal received in the receiver 210 may have various standards according to the types of the display apparatus 200, and for example, the receiver 210 may receive an image signal by a cable through composite video, component video, super video, Syndicat des Constructeurs d'Appareils Radiorécepteurs et Téléviseurs (SCART), and the like standards.

The image content received in the display apparatus 200 according to an embodiment is not limited to that from the content providing apparatus 100. For example, the receiver 210 may wirelessly receive an RF signal, i.e. a broadcast signal from the broadcasting station. According to an embodiment, the receiver 110 may include a tuner to be tuned to channels for broadcast signals.

Further, the image signal may be received from various external devices, for example, a smart phone, a tablet computer and the like smart pad, a mobile device including an MP3 player, a desktop or laptop computer (i.e., a personal computer (PC)). Further, the image signal may be based on data received through Internet or the like network. In this case, a communicator for supporting the wired or wireless network communication may be further provided.

Further, the image signal may be based on data stored in a second storage 250, which may be a flash memory, a hard disk drive, a nonvolatile storage and/or other types of storage devices. The second storage 250 may be provided inside or outside the display apparatus 200. In the case where the second storage 250 is provided outside the display apparatus 200, a connector may be further provided to connect with the second storage 250.

The second image processor 220 performs various preset video/audio processing processes with regard to an image signal received from the image receiver 110. The second image processor 220 performs such an image processing process to create and combine a signal and outputs the signal to the first display 230, so that the first display 230 can display an image based on the image signal.

The second image processor 220 includes a decoder for decoding an image signal to have an image format for the display apparatus 200, and a scaler for scaling the image signal according to the output standards of the display 230. According to an embodiment, the scaler may sale the image signal according to the output characteristics of the display 230. Here, the second image processor 220 according to the embodiment is not limited to any one type of processing. For example, the second image processor 220 may further perform at least one among various processes such as resolution conversion, color change, color-space conversion, brightness control, noise reduction, etc.

The image signal processed by the second image processor 220 is not limited to the image signal or content received from the content providing apparatus 100. According to an embodiment, the display apparatus 200 may directly receive the dynamic HDR content in a streaming mode, and apply processes, such as decoding, scaling, etc., to the received dynamic HDR content to be displayed on the display 230. The second image processor 220 performs the image process so that an image can be displayed at a predetermined speed (e.g. the general playback or the variable-speed playback) corresponding to a command issued by a user.

The materialization of the second image processor 220 corresponds to the materialization of the first image processor 120 in the content providing apparatus 100 as described above.

The image signal processed by the second image processor 220 is output to the display 230. The display 230 displays an image based on the image signal received from the second image processor 220.

The display 230 may be achieved by various display types without limitations, for example, liquid crystal, plasma, light-emitting diode, organic light-emitting diode, surface-conduction electron-emitter, carbon nano-tube, nano-crystal, or the like display type. The display 230 may further include additional elements (e.g. a driver in accordance with types.

The second user input portion 240 transmits various preset control commands or unrestricted information to the second controller 260 in response to a user's input.

The second user input portion 240 includes a keypad (or an input panel) including buttons such as a power key, a menu key, a numeral key, etc. provided in the main body of the display apparatus 200. According to one embodiment, the second user input portion 240 includes an input unit for generating a preset command/data/information/signal previously set for remotely controlling the display apparatus 200 and transmitting it to the display apparatus 200.

The input unit is provided separately from the main body of the display apparatus 200 like a remote controller, a mouse, a keyboard, etc. and allows a user to make an input. The remote controller may be provided with a touch sensor for sensing a user's touch input and/or a motion sensor for sensing its own motion caused by a user. The input unit may include a terminal such as a smart phone, in which a remote-control application is installed. In this case, the input unit may receive a user's touch input through a touch screen.

The input unit serves as an external apparatus for wireless communication with the main body of the display apparatus 200, and the wireless communication includes Bluetooth, infrared communication, radio frequency communication, wireless local area network (WLAN), Wi-Fi direct, etc.

According to one embodiment, the input unit may be materialized by a universal remote controller for controlling both the content providing apparatus 100 and the display apparatus 200.

According to one embodiment, the second user input portion 240 including the input unit may receive a user command issued for playing content back at a predetermined speed, i.e. a general playback or variable-speed playback command.

The second storage 250 is configured to store various pieces of data of the display apparatus 200. The materialization of the second storage 250 corresponds to the materialization of the first storage 150 in the content providing apparatus 100 described above.

Data stored in the second storage 250 may, for example, include not only an operating system for operating the display apparatus 200, but also various applications to be run on the operating system, image data, additional data, etc.

Specifically, the second storage 250 is configured to store a signal or data input/output corresponding to operations of the elements under control of the second controller 260. The second storage 250 may be configured to store a control program for controlling the display apparatus 200, a UI related to an application provided by a manufacturer or downloaded from the outside, images for providing the UI, user information, a document, databases or relevant data.

The second storage 250 of the display apparatus 200 according to an embodiment may be configured to store reference data for the compensatory process. According to an embodiment, the compensatory process may be tone mapping of the HDR content. The reference data refers to standard metadata having a value corresponding to a predetermined reference. According to an embodiment, the display apparatus 200 may generate a tone mapping curve based on the reference data stored in the second storage 250 when the HDR content including the additional data having a predetermined format is received from the content providing apparatus 100.

The second controller 260 performs control for operating general elements of the content providing apparatus 100. The second controller 260 may include a control program (or instruction) for implementing such a control operation, a nonvolatile memory in which the control program is installed, a volatile memory in which at least a part of the installed control program is loaded, and at least one processor or CPU for executing the loaded control program. The materialization of the second controller 260 corresponds to the materialization of the first controller 160 in the content providing apparatus 100 described above.

When the display apparatus 200 according to an embodiment is a monitor, the second controller 260 may further include a GPU (not shown) for graphic processing. Alternatively, when the display apparatus 200 is a digital TV, the processor may include the GPU, and the processor may be in the form of an SoC, where a core processor and the GPU are combined.

According to an embodiment, the operations of the second controller 260 may be achieved by a computer program stored in the computer program product (not shown) provided separately from the display apparatus 200.

In this case, the computer program product includes a memory where an instruction corresponding to the computer program is stored, and a processor. The instruction may be issued to include receiving the content data and the additional data from the content providing apparatus 100 when it is executed by the processor, and performing the compensatory process based on the reference data when the received additional data has a predetermined format.

Thus, the display apparatus 200 downloads and executes the computer program stored in a separate computer program product, thereby performing the operations of the second controller 260.

According to an embodiment, the second controller 260 controls the second image processor 220 to process the content data, which is received from the content providing apparatus 100, to be displayed on the display 230. Here, the content data is included in the dynamic HDR content.

The second controller 260 generates a tone mapping curve based on the additional data received from the content providing apparatus 100 in this process, and controls the content data to be subjected to the compensatory process, i.e. tone mapping based on the generated tone mapping curve. Such a compensatory process is a dynamic compensatory process (i.e. first compensatory process) based on the received additional data, i.e. the dynamic metadata according to the displayed scenes.

When it is determined that the received additional data has a predetermined format, the second controller 260 controls content data to be subjected to the compensatory process, i.e. tone mapping based on the tone mapping curve generated by the predetermined reference data. When the received additional data has the predetermined format, the compensatory process is based on the fixed value data even when the scenes are changed, and is therefore the static compensatory process (i.e. the second compensatory process).

According to an embodiment, according to the second compensatory process, each parameter of the metadata has a value of "0", and the second compensatory process may be performed using not the received additional data but the reference data autonomously provided in the display apparatus 200. Alternatively, when each parameter of the received metadata has a value of a previous scene, the second compensatory process may be performed using the metadata of the previous scene. Alternatively, when the received metadata is the static metadata, the second compensatory process may be performed using the static metadata.

The additional data having a predetermined format is transmitted from the content providing apparatus 100 to the display apparatus 200 in response to a content playback command for a predetermined speed or higher, issued in the content providing apparatus 100. The content playback command for a predetermined speed or higher may be for example the variable-speed playback command received through the first user input portion 140 of the content providing apparatus 100 or the second user input portion 240 of the display apparatus 200.

According to another embodiment, the display apparatus 200 may be configured to receive an instruction to reproduce the image content at a first speed, determine whether the first speed is greater than a reference speed, change a value in additional data corresponding to the image content and display the image content based on changed additional data. The additional data may be metadata information regarding the tonal characteristics of the content image.

For instance, the receiver 200 may receive an image content to be display on display 230. Also, the second user input portion 240 may receive an instruction to control the speed at which the image content is displayed on the display 230. The second controller 260 may determine whether the speed from the instruction is greater than a reference speed and change a value in additional data corresponding to the image content. Thereafter, the second controller may control the second image processor 220 to process the image content based on the changed value in the additional data and control the display 230 to display the image content processed by the second image processor 220.

Figure 7:
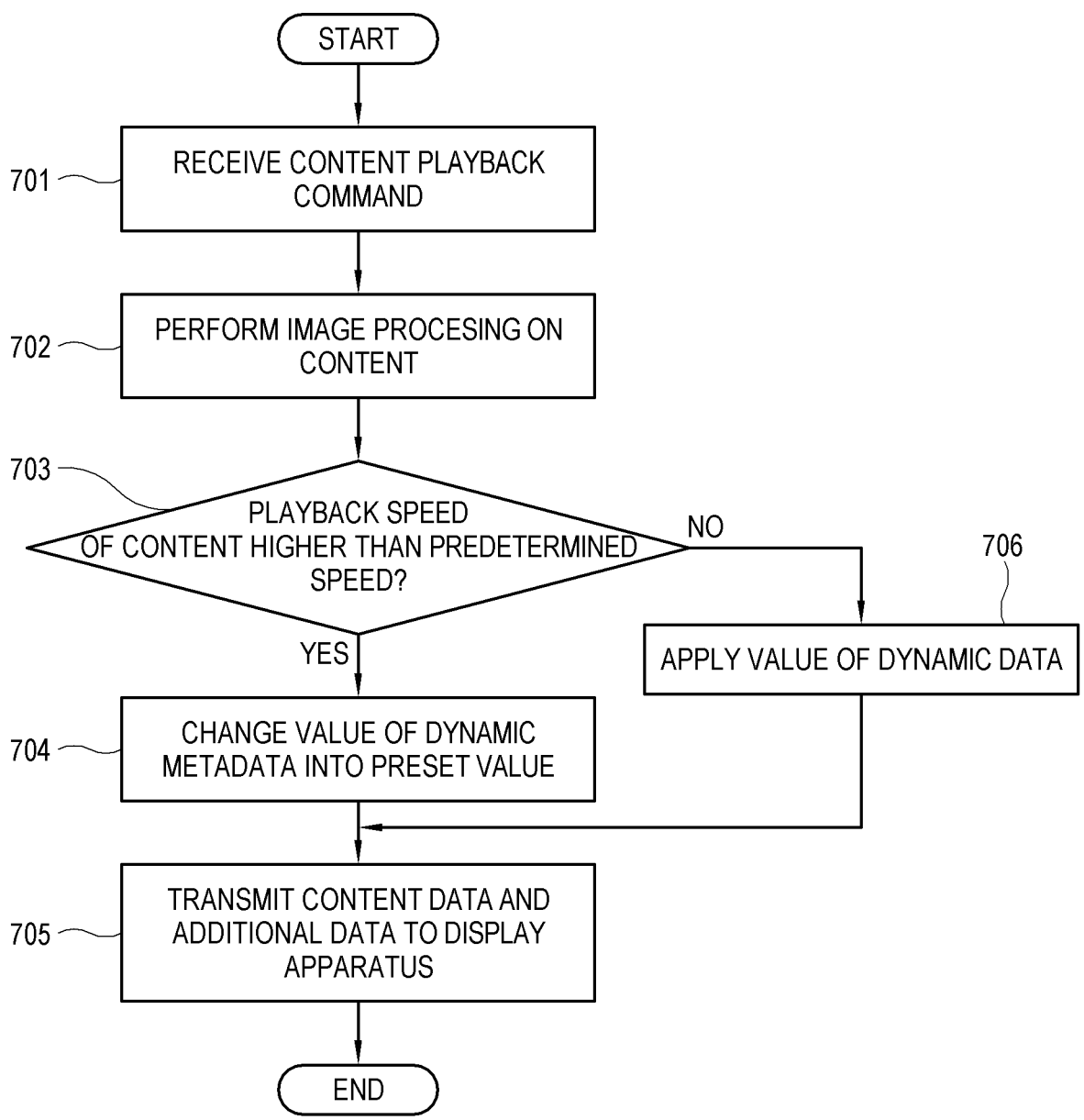
FIG. 7 is a flowchart showing a control method of a content providing apparatus according to an embodiment.
Figure 8:
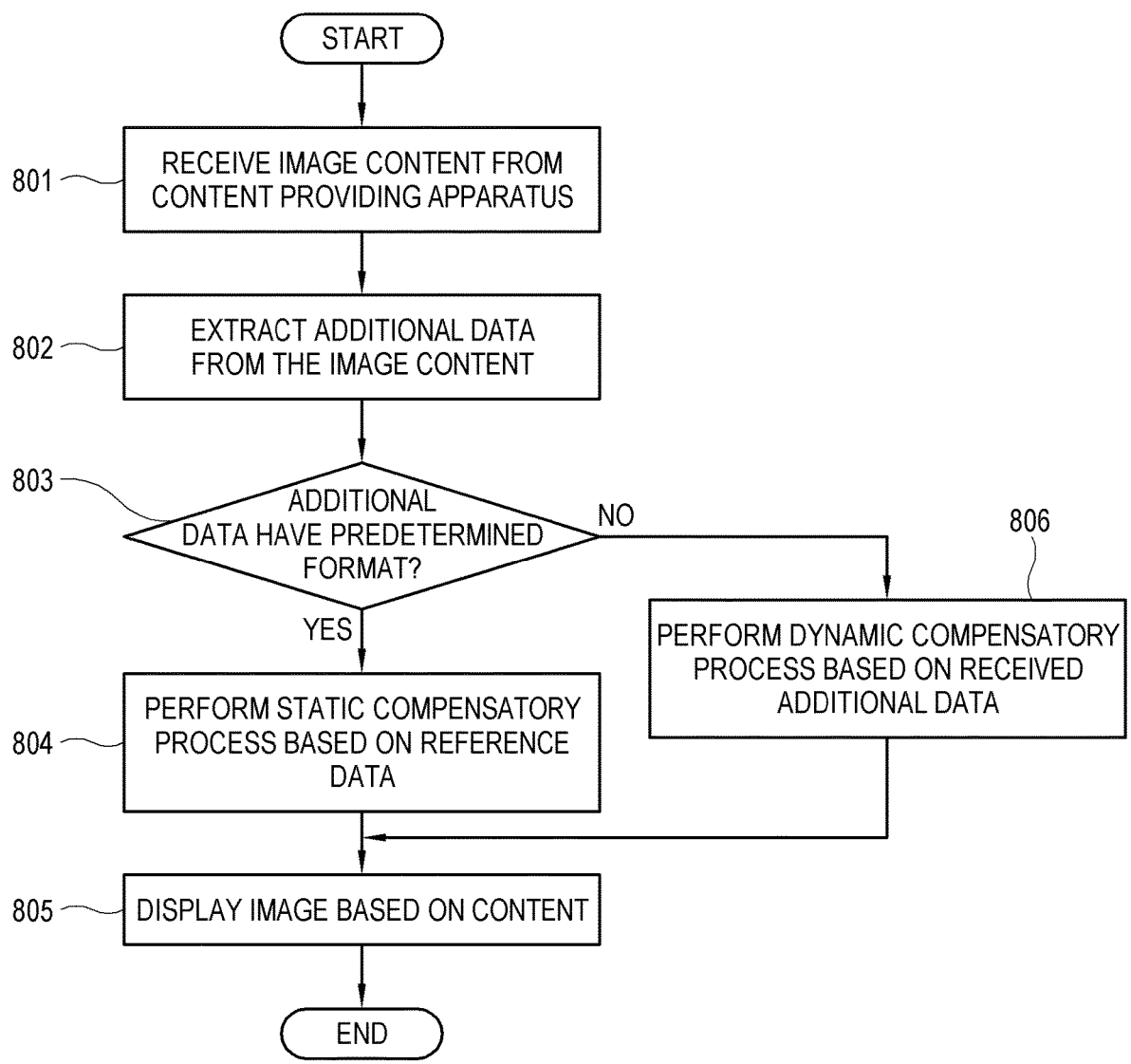
FIG. 8 is a flowchart showing a control method of a display apparatus according to an embodiment.

FIGS. 7 and 8 are flowcharts showing control methods of a content providing apparatus and a display apparatus according to an embodiment.

As shown in FIG. 7, the content providing apparatus 100 receives a command for playing predetermined content back (701). Here, the first controller 160 of the content providing apparatus 100 may receive a content playback command from a user through a remote controller provided as the first user input portion 140. For example, the content is the dynamic HDR content stored in a BD or the like optical disc provided as the first storage 150, and includes content data corresponding to audio and video signals, and additional data of the content data. The additional data includes dynamic metadata for tone mapping for the dynamic HDR content as shown in FIG. 6.

The first controller 160 performs an image processing operation on the content in response to the received playback command of the operation 701 (702). The image processing operation 702 includes decoding the HDR content performed by the first image processor 120, and dividing or extracting the content data and the additional data based on the decoding. According to an embodiment, the dynamic metadata is obtained through the image processing operation 702.

The first controller 160 determines whether the playback speed of the content is equal to or higher than a predetermined speed (703). Here, when the playback command received in the operation 701 is the variable-speed playback command for 2×, 4×, 8×, 16× or the like speed, it is determined that the playback speed of the content is equal to or higher than the predetermined speed. The variable-speed playback may include a chapter skip playback, a frame unit playback, etc. In the operation 701, the variable-speed playback command may be received while the general playback of the content is performed.

When it is determined in the operation 703 that the playback speed of the content is equal to or higher than a predetermined speed, the first controller 160 assigns a preset value to the additional data extracted in the operation 702 (704). That is, the first controller 160 assigns the preset value to the dynamic metadata corresponding to the sections having the predetermined playback speed or higher. By the operation 704, the additional data is changed into data having a fixed value in the plurality of sections (scenes) corresponding to the variable-speed playback. That is, in the variable-speed playback section, every value of the plurality of parameters corresponding to the metadata shown in FIG. 6 is changed into a preset value. According to an embodiment, the preset value is "0". According to another embodiment, the preset value is a value of the metadata of the previous scene. According to yet another embodiment, the preset value is a value of fixed metadata (or static metadata), and may have a default value.

The first controller 160 transmits the content data, which is subjected to the image process in the operation 702, and the additional data, the value of which is changed in the operation 703 with regard to the corresponding section, to the display apparatus through the transmitter 110 (705).

On the other hand, when it is determined in the operation 703 that the playback speed of the content is lower than the predetermined speed, the first controller 160 applies the values of the dynamic metadata, i.e. the additional data extracted in the operation 702 with regard to the corresponding section, without any changes to the dynamic metadata regarding the tone mapping process (706).

Therefore, the content data subjected to the image process in the operation 702 and the additional data are transmitted to the display apparatus 200 (705). In this case, the additional data to be transmitted is the dynamic metadata to which the original value of the content is directly applied.

As shown in FIG. 8, the display apparatus 200 receives image content from the content providing apparatus 100 through the receiver 210 (801). Here, the received content is the dynamic HDR content which includes content data corresponding to audio and video signals and additional data of the content data. The additional data includes the metadata, and the metadata is the dynamic metadata, which is included for the tone mapping when the content is created, or the metadata, the value of which is changed in the operation 704 of FIG. 7.

The display apparatus 200 divides the content data and the additional data from the received HDR content (802). The second controller 260 of the display apparatus 200 controls the second image processor 220 to perform the image process such as scaling so that the divided content data can be displayed on the display 230.

The second controller 260 determines whether the additional data divided in the operation 802, i.e. the metadata received from the content providing apparatus 100 has a predetermined format (803). Here, the determination of whether the received metadata has the predetermined format is based on whether it is the variable-speed playback or the general playback of the content. The second controller 260 may determine that the metadata has a predetermined format when the metadata has a preset value. According to one embodiment, the preset value is "0". According to alternative embodiment, the preset value is a value of metadata of the previous scene. Alternatively, the preset value is a value of fixed metadata (or static metadata), and may have a default value.

When it is determined in the operation 803 that the additional data has a predetermined format, i.e. a preset value, the second controller 260 performs the static compensatory process based on the reference data with regard to the corresponding section (804). Here, the compensatory process includes generating a tone mapping curve, and performing tone mapping based on the generated tone mapping curve. According to one embodiment, when the additional data, i.e. the divided metadata has a value of "0", the second controller 260 uses not the additional data received in the operation 801 but standard data stored in the second storage 250 as the reference data to thereby perform the compensatory process. According to alternative embodiment, when the additional data, i.e. the divided metadata maintains the value of the metadata of the previous scene, the second controller 260 uses the metadata of the previous scene as the reference data to thereby perform the compensatory process. According to an alternative embodiment, when the divided metadata is the static metadata, the static metadata is used as the reference data to thereby perform the compensatory process.

According to the foregoing embodiments, the static compensatory process is performed based on the metadata having a fixed value in the variable-speed playback section where the additional data has a predetermined format, and thus there are no needs of generating a new mapping curve even though the scene is changed, thereby facilitating a real-time image process without a process delay.

Then, the second controller 260 controls the display 230 to display an image of the content based on the content data processed in the operation 802 and the additional data subjected to the static compensatory process in the operation 804 (805). Such an image is displayed with brightness corresponding to the static compensatory process in the operation 804.

On the other hand, when it is determined in the operation 803 that the additional data does not have the predetermined format, the second controller 260 performs the dynamic compensatory process based on the additional data, i.e. the dynamic metadata received in the operation 801 with regard to the corresponding section (806). Specifically, the second controller 260 generates a tone mapping curve from the metadata received in the operation 801, and performs the tone mapping on the content data in accordance with the generated tone mapping curve.

The second controller 260 controls the display 230 to display an image of the content based on the content data processed in the operation 806 and the additional data subjected to the dynamic compensatory process in the operation 805 (805). Such an image of the dynamic HDR content is displayed with brightness adjusted by the dynamic compensatory process in the operation 806 according to the brightness of the scene. Therefore, in not the variable-speed playback section but the general playback section, the dynamic HDR content is displayed as an image with high quality and high brightness as intended when it is created.

Below, various embodiments of the methods of controlling the content providing apparatus and the display apparatus described with reference to FIGS. 7 and 8 are as follows.

First Embodiment

Figure 9:
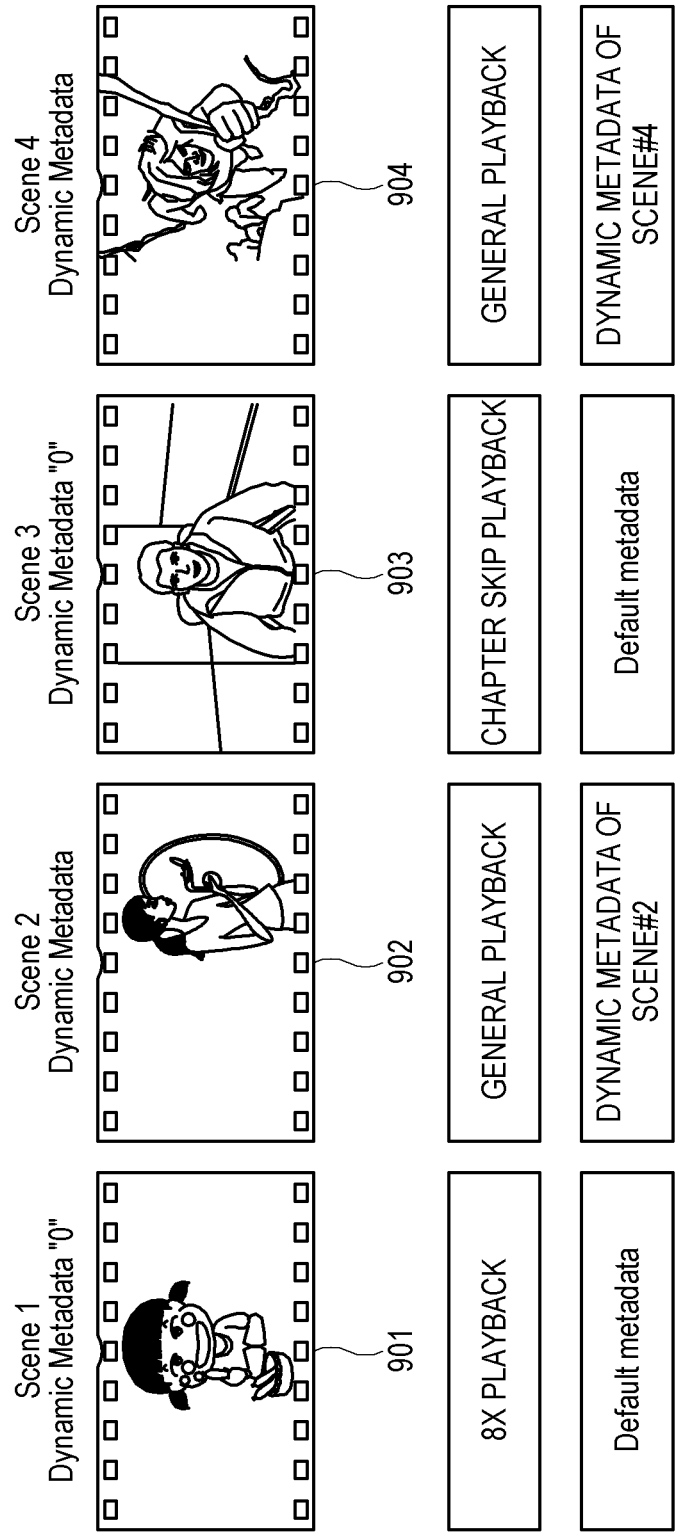
FIGS. 9 and 10 are views for explaining a first embodiment.
Figure 10:
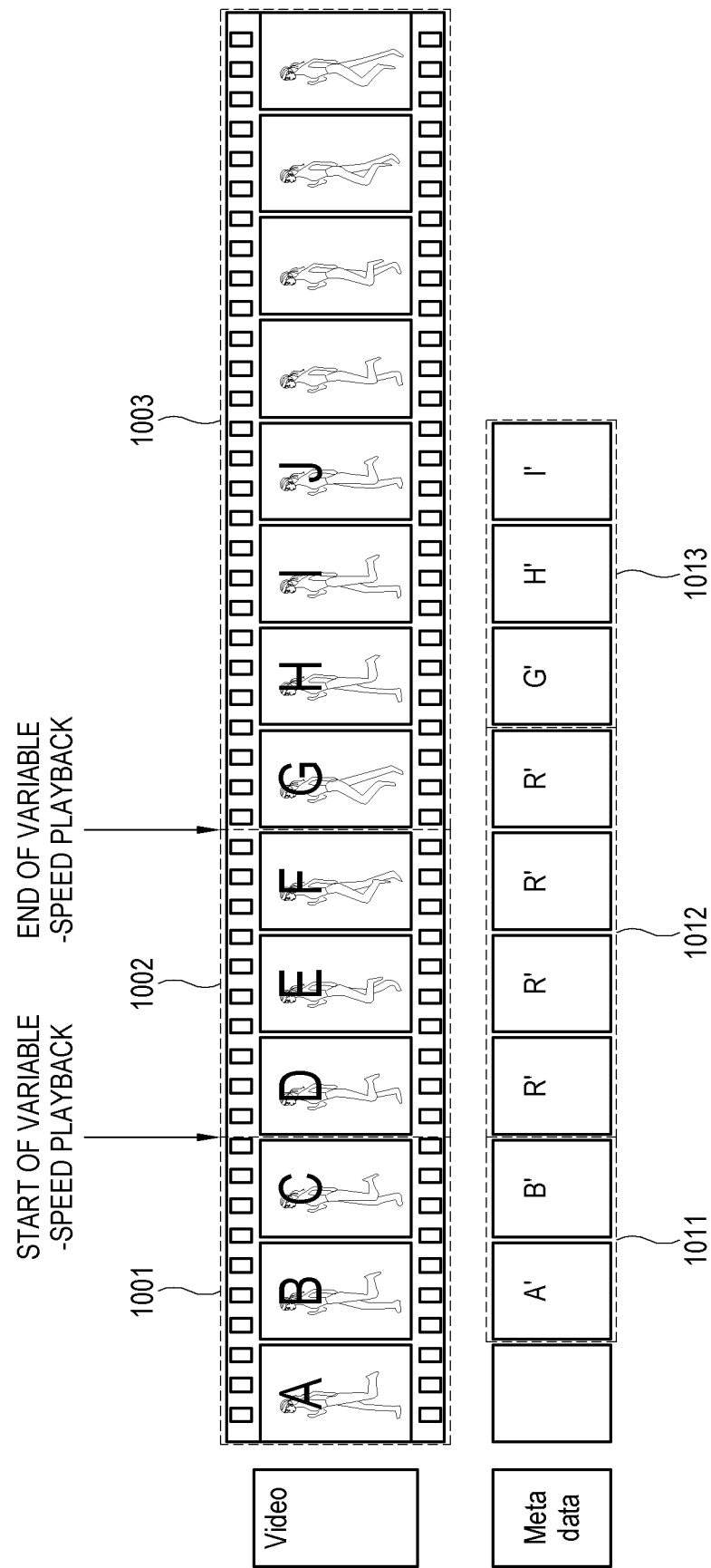

FIGS. 9 and 10 are views for explaining a first embodiment.

According to the first embodiment, the content providing apparatus 100 for processing the dynamic HDR content changes the metadata for the variable-speed playback section (or scene) of the dynamic HDR content by assigning a value of "0" when a user's variable-speed playback command is received. Here, the value of "0" to be assigned is previously set as a default value, and a default value other than "0" may be used according to another embodiment.

In the first embodiment, the additional data for each section (scene) of the content data includes dynamic metadata (a general playback section) as information corresponding to the first compensatory process or metadata (a variable-speed playback section) assigned with the value of "0".

According to the sections (scenes) of the content data, the display apparatus 200 performs the first compensatory process using the dynamic metadata, i.e. the dynamic tone mapping with regard to the sections having the dynamic metadata, and performs the second compensatory process, i.e. the static tone mapping with regard to the sections having no dynamic metadata (e.g. sections where an abnormal value of "0" is assigned to the whole metadata). Here, the second compensatory process is performed based on the reference data stored in the display apparatus 100.

Specifically, as shown in FIG. 9, when a command is issued to play a scene#1 901 back at an 8× playback, the value of the metadata for the scene#1 901 is changed into "0". On the other hand, the original value of the metadata is applied to a scene#2 902 to be played back at a general speed. Likewise, when a command is issued to play a scene#3 903 back in a chapter skip mode, the value of the metadata for the scene#3 903 is changed into "0". The original value of the metadata is applied to a scene#4 904 to be played back at a general speed.

In the first embodiment, the content data and the additional data, in which the value of the metadata is changed into "0" or to which the original value of the metadata is directly applied, are transmitted from the content providing apparatus 100 to the display apparatus 200.

The display apparatus 200 receives the dynamic HDR content, i.e. the content data and the additional data from the content providing apparatus 100. The display apparatus 200 performs an image process so that the received content data can be displayed on the display 230, i.e. performs the first compensatory process (or the dynamic compensatory process) or the second compensatory process (or the static compensatory process) with regard to the content data on the basis of the format of the additional data received according to the sections of the content data.

Specifically, as shown in FIG. 9, the scene#1 to be played back at the 8× playback is determined as it has a predetermined format since the value of the metadata is "0", and thus subjected to the static compensatory process based on the reference data. That is, the second controller 260 of the display apparatus 200 checks that the additional data corresponding to the scene#1 is not the normal dynamic metadata but has the value of "0", and determines the additional data as the abnormal metadata. Thus, the second controller 260 employs not the received abnormal metadata but the default metadata of the standard data stored in the second storage 250 as the reference data, generates the corresponding tone mapping curve, and performs the tone mapping based on the generated tone mapping curve.

On the other hand, the scene#2 to be played back at the general speed is determined as it does not have the predetermined format since the original value of the metadata of when the content is created is applied, and thus subjected to the dynamic compensatory process based on the received additional data. That is, the second controller 260 determines that the metadata corresponding to the scene#2 is the normal dynamic metadata, generates the tone mapping curve based on the received metadata, and performs the tone mapping based on the generated tone mapping curve.

Likewise, the scene#3 to be played back in the chapter skip mode is determined as it has the predetermined format since the value of the metadata is and thus subjected to the static compensatory process based on the reference data. Further, the scene#4 to be played back at the general speed is determined as it does not have the predetermined format since the original value of the metadata of when the content is created is applied, and thus subjected to the dynamic compensatory process based on the received additional data.

Accordingly, in the first embodiment, as shown in FIG. 10, the static compensatory process using default metadata R' 1012 is performed with regard to a variable-speed playback section, i.e. scenes D, E and F 1002 of content data. On the other hand, the dynamic compensatory process using dynamic metadata A', B' 1011 and G', H', I' 1013 of the corresponding scenes is performed with regard to a general playback section, i.e. the scene A, B, C 1001 and G, H, I, J 1003.

Second Embodiment

Figure 11:
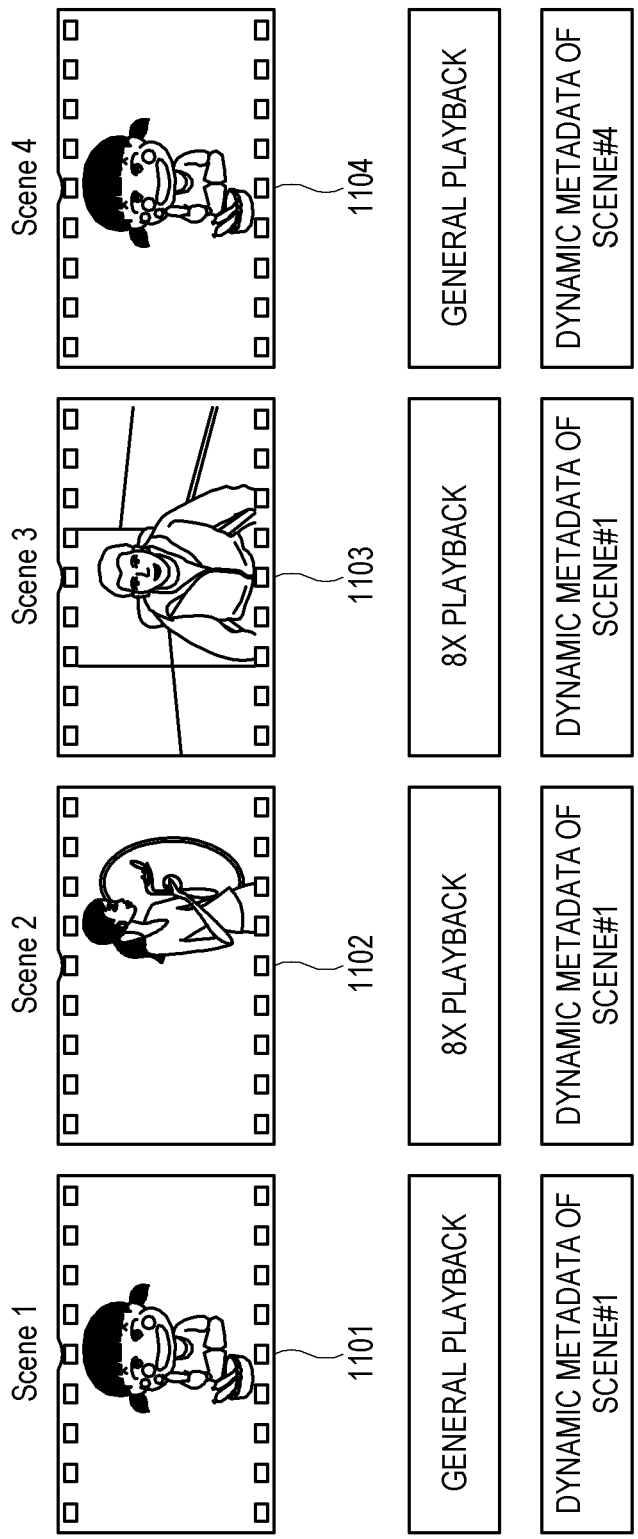
FIGS. 11 and 12 are views for explaining a second embodiment.
Figure 12:
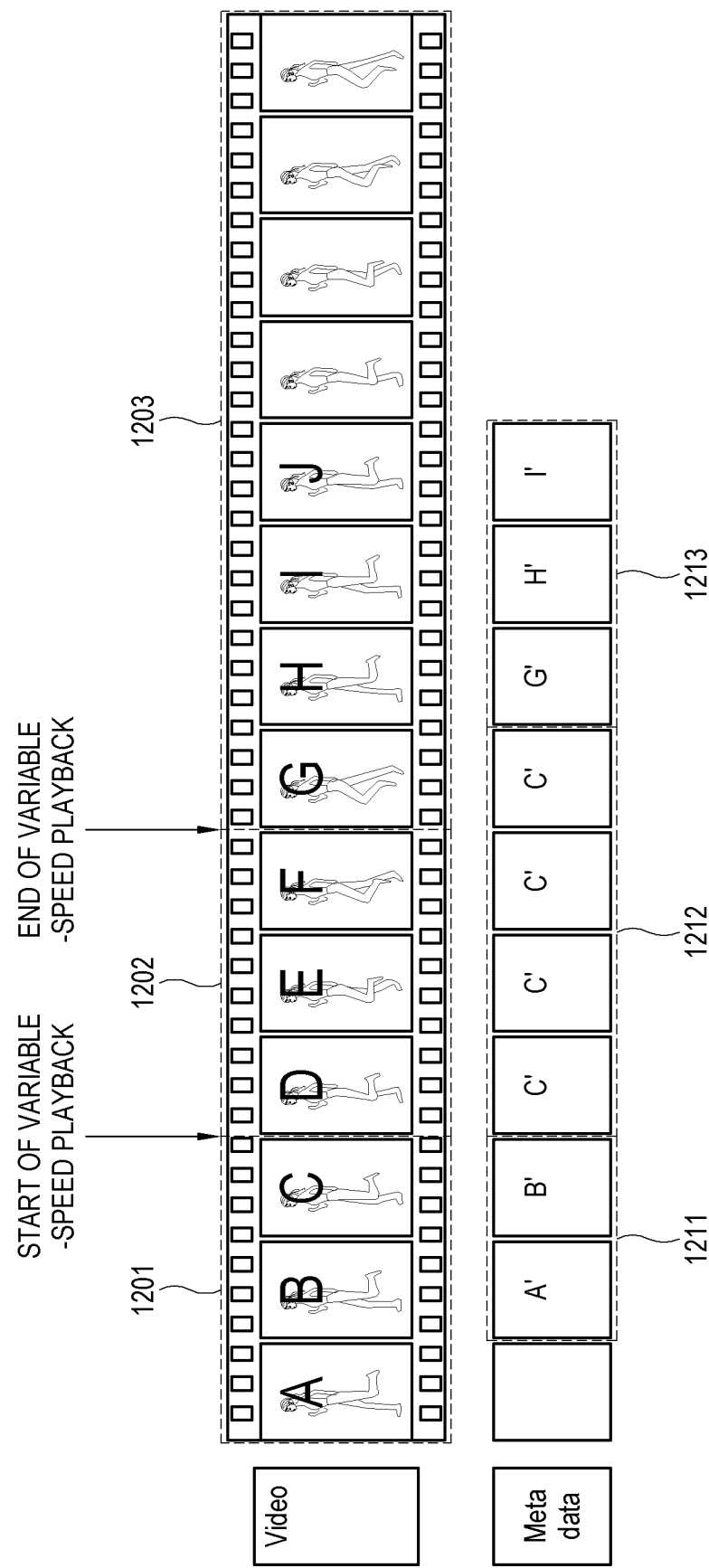

FIGS. 11 and 12 are views for explaining a second embodiment.

According to the second embodiment, the content providing apparatus 100 for processing the dynamic HDR content changes the metadata for the variable-speed playback section of the dynamic HDR content by assigning a value of the previous scene when a user's variable-speed playback command is received. That is, the metadata is assigned with not the value of the current scene but the value of the previous scene in the variable-speed playback section even though the scene of the dynamic HDR content is switched over from the previous scene to the current.

In the second embodiment, the additional data may include the dynamic metadata or the static metadata according to the sections of the content data, as information corresponding to each of the first and second compensatory processes. That is, when the metadata is assigned with the value of the previous scene, the value is fixed without a renewal even when the scene is changed, and thus the metadata actually becomes the static metadata.

Specifically, as shown in FIG. 11, when a scene#1 1101 is played back at a general speed, the original value of the dynamic metadata is directly applied to the scene 1101. At a point in time of switching over to the next scene#2 1102, when a command is issued for an 8× playback, the value of the metadata for the previous scene, i.e. the scene#1 1101 is continuously applied without being changed into the value of the metadata for the scene#2 1102. Since the 8× playback is continuously applied to even a scene#3 1103, the value of the metadata for the scene#1 1101 is continuously applied. Then, a scene#4 1104 is changed for the general playback, the value of the metadata is changed into the value of the metadata for the scene 1104.

In the second embodiment, the content data and the additional data, to which the value of the metadata for the previous scene is applied or which the original value of the dynamic metadata is applied, are transmitted from the content providing apparatus 100 to the display apparatus 200.

The display apparatus 200 receives the dynamic HDR content, i.e. the content data and the additional data from the content providing apparatus 100. The display apparatus 200 performs an image process so that the received content data can be displayed on the display 230, i.e. performs the first compensatory process (or the dynamic compensatory process) or the second compensatory process (or the static compensatory process) with regard to the content data on the basis of the format of the additional data received according to the sections of the content data.

The display apparatus 200 performs the first compensatory process with regard to the section including the dynamic metadata, and performs the second compensatory process with regard to the section including the static metadata. Here, the static metadata is maintained as it is without updating the metadata of the previous section (or scene) with the value of the current scene, and the second compensatory process is performed based on the additional data corresponding to the previous section.

Specifically, as shown in FIG. 11, the scene#1 1101 to be played back at the general speed is determined as it does not have the predetermined format since the original value of the dynamic metadata of when the content is created is applied, and thus subjected to the dynamic compensatory process based on the received additional data. That is, the second controller 260 of the display apparatus 200 determines that the additional information of the scene #1 1101 includes the dynamic metadata, generates the tone mapping curve based on the received current metadata, and performs the tone mapping based on the generated tone mapping curve.

Regarding the scene#2 1102 to be played back at the 8× playback, the second controller 260 does not have to generate a new mapping curve since the received metadata has the same value as the metadata of the previous scene, i.e. the scene#1 1101, and thus the scene#2 1102 is subjected to the static compensatory process. That is, the second controller 260 performs the tone mapping using the metadata of the previous scene (i.e. the scene#1) as the reference data.

Regarding even the scene#3 1103 to be played back at the 8× playback, the second controller 260 does not generate a new mapping curve since the received metadata has the same value as the metadata of the previous scene, i.e. the scene#2 1102, and thus the scene#3 1103 is subjected to the static compensatory process. That is, the second controller 260 performs the tone mapping using the metadata of the previous scene (i.e. the scene#1) as the reference data.

The scene#4 1104 to be played back at the general speed is determined as it does not have the predetermined format since the original value of the metadata of when the content is created is applied as the value of the corresponding metadata, and thus subjected to the dynamic compensatory process based on the received additional data.

Accordingly, in the second embodiment, as shown in FIG. 12, the static compensatory process using default metadata C' 1212 of the previous scene C is performed with regard to a variable-speed playback section, i.e. scenes D, E and F 1202 of content data. On the other hand, the dynamic compensatory process using dynamic metadata A', B' 1211 and G', H', I' 1213 of the corresponding scenes is performed with regard to a general playback section, i.e. the scene A, B, C 1201 and G, H, I, J 1203.

Third Embodiment

Figure 13:
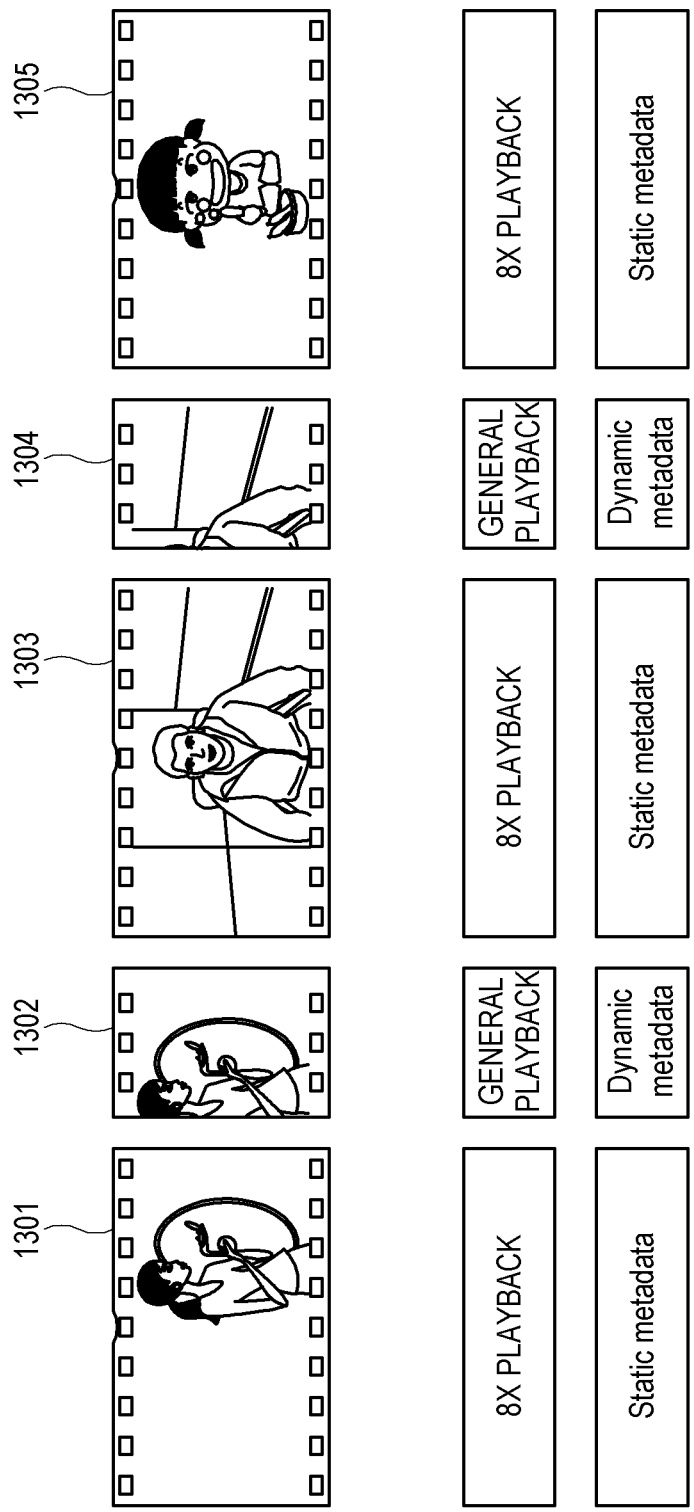
FIGS. 13 and 14 are views for explaining a third embodiment.
Figure 14:
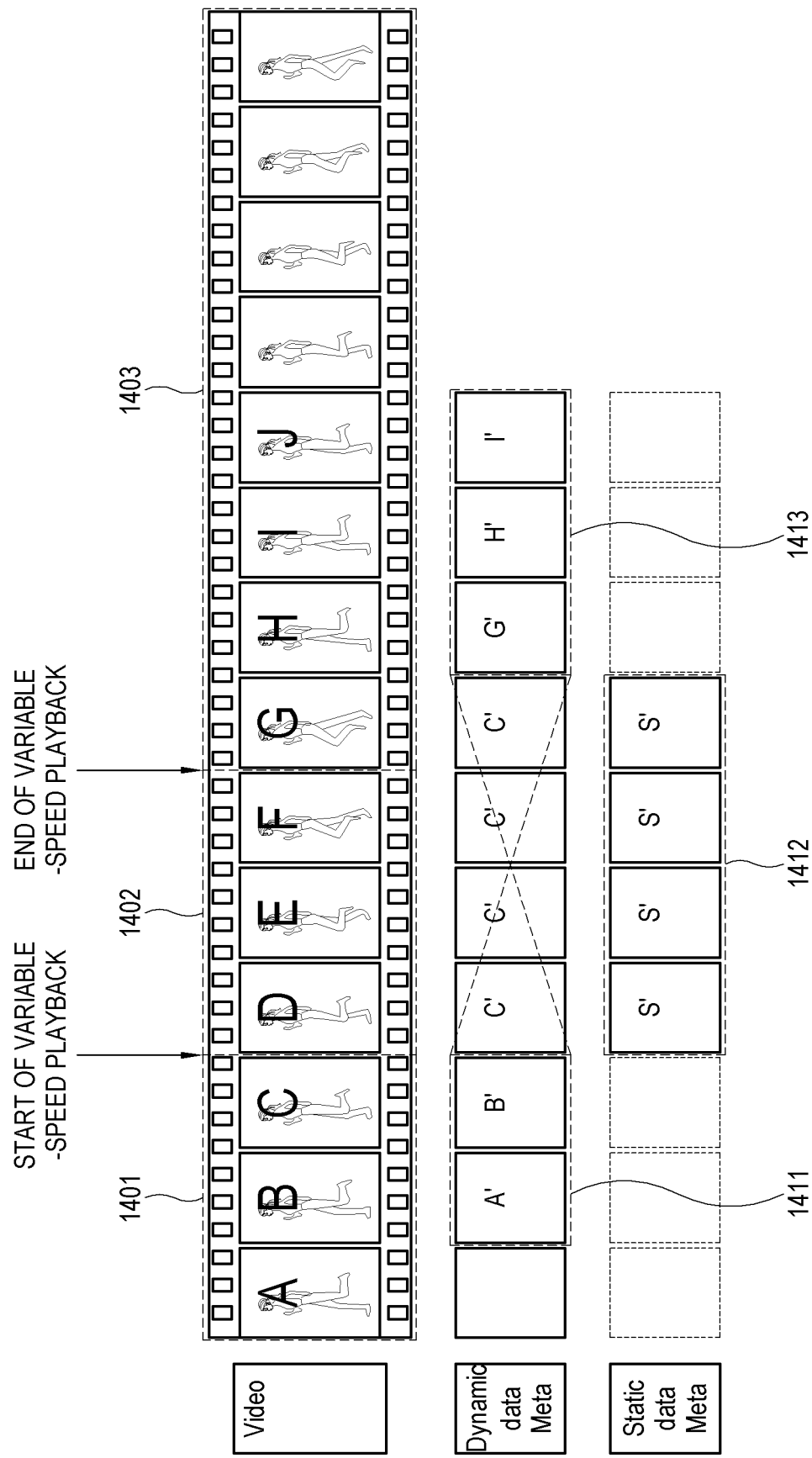

FIGS. 13 and 14 are views for explaining a third embodiment.

According to the third embodiment, the content providing apparatus 100 for processing the dynamic HDR content makes the static metadata be included as the additional data in the scene corresponding to the dynamic HDR content when a user's variable-speed playback command is received.

In the third embodiment, the additional data may include the dynamic metadata or the static metadata according to the sections of the content data, as information corresponding to each of the first and second compensatory processes. Further, the additional data of each scene includes identification information for identifying whether the included information is the dynamic metadata or the static metadata.

Specifically, as shown in FIG. 13, the scene#1 1301 is played back at an 8X playback, the value of the static metadata is assigned to the scene 1301. In this case, the predetermined bit assigned as the flag for indicating the static or dynamic metadata in the additional data 600 shown in FIG. 6 is changed to indicate the static metadata (for example, switched over from "1" to "0"). Here, the assigned value of the static metadata may be the default value previously stored in the first storage 150 of the content providing apparatus 100.

When a command is issued to play the next subsequent scene #2 1302 back at the 8× playback, the original value of the dynamic metadata for the scene#2 1302 is applied as it is. In this case, the predetermined bit assigned as the flag for indicating the static or dynamic metadata in the additional data 600 shown in FIG. 6 is changed to indicate the dynamic metadata (for example, switched over from "0" to "1").

Since the 8× playback is also applied to the subsequent scene#3 1303, the value of the static metadata is assigned like the scene#1 1301. Next, the general playback is applied to the subsequent scene#4 1304, and therefore the value of the dynamic metadata is assigned like the scene#2 1302. Further, the 8× playback is applied to the subsequent scene#5 1305, and therefore the value of the static metadata is assigned like the scene#1 1301 and the scene#3 1303.

According to the third embodiment, the content data and the additional data, which includes one of the static metadata and the dynamic metadata in accordance with the variable-speed playback or the general playback, are transmitted from the content providing apparatus 100 to the display apparatus 200.

The display apparatus 200 receives the dynamic HDR content, i.e. the content data and the additional data from the content providing apparatus 100. The display apparatus 200 performs an image process so that the received content data can be displayed on the display 230, i.e. performs the first compensatory process (or the dynamic compensatory process) or the second compensatory process (or the static compensatory process) with regard to the content data on the basis of the format of the additional data received according to the sections of the content data.

The display apparatus 200 performs the first compensatory process with regard to the section including the dynamic metadata, and performs the second compensatory process with regard to the section including the static metadata.

Specifically, the second controller 260 of the display apparatus 200 identifies the bit assigned as the flag for indicating the static or dynamic metadata in the additional data received corresponding to a predetermined scene, and determines whether the metadata of the corresponding scene is the static metadata or the dynamic metadata. In accordance with the determination results, the second controller 260 performs the static compensatory process or the dynamic compensatory process on the scene.

Specifically, as shown in FIG. 13, the second controller 260 determines the static metadata based on the bit identified in the additional data of the scene#1 at the variable-speed playback, and controls the static compensatory process to be performed using the static metadata with regard to the corresponding scene 1301.

Regarding the subsequent scene#2 1302 at the general playback, the dynamic metadata is determined based on the bit identified in the received additional data, and the corresponding scene#2 1302 is subjected to the dynamic compensatory process using the dynamic metadata. In other words, the tone mapping curve is generated using the dynamic metadata of the scene#2 1302, and the tone mapping is performed based on the generated mapping curve.

In the same manner, it is determined that the static metadata is received with regard to the scene#3 1303 and the scene#5 1305, and the scene#3 1303 and the scene#5 1305 are controlled to be subjected to the static compensatory process. Further, it is determined that the dynamic metadata is received with regard to the scene#4, and the scene#4 is controlled to be subjected to the dynamic compensatory process.

According to the third embodiment, as shown in FIG. 14, scenes A, B, C 1401 corresponding to the general playback sections of the content data are subjected to the dynamic compensatory process using dynamic metadata A' and B' 1411 of the corresponding scenes. When the subsequent scenes D, E and F 1402 correspond to the variable-speed playback sections, the static compensatory process is performed using static metadata S' 1412 but not the dynamic metadata of the corresponding scenes. Then, the subsequent scenes G, H, I and J 1403 corresponding to the general playback sections are subjected to the dynamic compensatory process using dynamic metadata G', H' and I' 1413 of the corresponding scenes.

According to the foregoing first to third embodiments, the general playback section is subjected to the static compensatory process using the metadata assigned with a preset value (e.g. "0", the value of the previous scene, the static metadata) regardless of changes in the scene, and the variable-speed playback section is subjected to the dynamic compensatory process using the dynamic metadata, the value of which is varied depending on changes in the scene changes. Accordingly, there are no needs of generating a new tone mapping curve per scene in the case of the variable-speed playback section.

Fourth Embodiment

According to a fourth embodiment, the additional data includes identification information about a playback speed for content data. Specifically, a specific bit of the additional data 600 is assigned as a flag for determining whether the content is played back at a predetermined speed or higher, i.e. distinguishing between the general playback or the variable-speed playback.

When a user's variable-speed playback command is received, the content providing apparatus 100 transmits the content data and the dynamic metadata as the additional data to the display apparatus 200 with regard to the dynamic HDR content corresponding to the variable-speed playback section, in which the specific bit of the transmitted additional data is assigned with or changed into a value for indicating the variable-speed playback (for example, switched over from "1" to "0").

The display apparatus 200 may determine the general playback or the variable-speed playback based on the identification information included in the received additional data, and performs the first compensatory process for the general playback section and the second compensatory process for the variable-speed playback section based on the determination results.

The display apparatus 200 identifies the corresponding bit from the received additional data, determines the variable-speed playback section when the value of the bit is "0" by way of example, and performs the static compensatory process based on the preset value with regard to the scenes corresponding to the variable-speed playback section. Here, the preset value may be "0" or the value of the previous scene as described in the first or second embodiment.

The display apparatus 200 identifies the corresponding bit from the received additional data, determines the general playback section when the value of the bit is an unchanged value, e.g. "1", and performs the dynamic compensatory process based on the received dynamic metadata with regard to the scenes corresponding to the general playback section.

Fifth Embodiment

A fifth embodiment is similar to the fourth embodiment in that the specific bit of the additional data 600 is assigned as the flag for identifying whether the content is played back at a predetermined speed of higher, i.e. determining the general playback and the variable-speed playback, but is different in that the display apparatus 200 performs the static compensatory process.

The display apparatus 200 performs the compensatory process by selectively skipping the received dynamic metadata with regard to the scenes corresponding to the variable-speed playback section determined by identifying the corresponding bit in the received additional data.

For example, when an image corresponding to five consecutive scenes is displayed at the variable-speed playback, the display apparatus 200 performs the tone mapping based on the metadata of the previous scene with regard to the first and second scenes, performs the tone mapping based on the tone mapping curve generated using the dynamic metadata of the corresponding scene with regard to the third scene, and performs the tone mapping based on the metadata of the third scene with regard to the fourth and fifth scenes. Thus, the display apparatus 200 selectively skips the dynamic metadata of some of the scenes of the content data according to processing speeds, thereby properly achieving synchronization between the image process and the compensatory process (i.e. tone mapping).

Sixth Embodiment

According to a sixth embodiment, the additional data 600 may include both the static metadata and the dynamic metadata. In this case, some bits of the additional data 600 are assigned to the static metadata, and other some bits are assigned to the dynamic metadata. Further, the specific bit of the additional data 600 may be assigned as the flag for distinguishing between the general playback or the variable-speed playback.

The content providing apparatus 100 transmits the content data and the additional data to the display apparatus 200, and the display apparatus 200 selectively extracts the static metadata or the dynamic metadata as necessary to thereby perform the tone mapping.

Specifically, the display apparatus 100 identifies the corresponding bit from the received additional data, determines the variable-speed playback section when the bit has a value of "0" by way of example, and applies the static compensatory process to the scenes corresponding to the variable-speed playback section by extracting the static metadata from the additional data. The display apparatus 200 identifies the corresponding bit from the received additional data, determines the general playback section when the bit has an unchanged value of "1" by way of example, and applies the dynamic compensatory process to the scenes corresponding to the general playback section by extracting the dynamic metadata from the additional data.

Seventh Embodiment

According to a seventh embodiment, the display apparatus 200 directly receives dynamic HDR content without the content providing apparatus 200. That is, the display apparatus 200 may receive the content data along with the additional data including the dynamic metadata through a network in a streaming mode.

When the display apparatus 200 receives a user's variable-speed playback command through the second user input portion 240 while outputting the dynamic HDR content, the dynamic metadata received corresponding to the variable-speed playback section is not used in the compensatory process for the tone mapping.

Specifically, the display apparatus 200 may apply the value of the metadata of the previous scene or perform the static compensatory process based on the standard data stored in the second storage 250 with regard to the scene of the variable-speed playback section.

Further, when a command is issued to switch over from the variable-speed playback to the general playback, the dynamic compensatory process based on the received dynamic data is performed on the scene corresponding to the general playback section.

The seventh embodiment may be performed in the form of combination with one of the foregoing first to sixth embodiments. For example, when the additional data 600 received in the streaming mode includes both the static metadata and the dynamic metadata, the second controller 260 of the display apparatus 200 controls the tone mapping to be performed based on the static metadata in the case of the variable-speed playback section, and the dynamic metadata in the case of the general playback section.

According to various embodiment as described above, when the dynamic HDR content is played back at a predetermined speed or higher like the variable-speed playback, the static compensatory process, i.e. the tone mapping based on not the dynamic metadata corresponding to each scene but predetermined reference data is performed so that the synchronization between the content data and the additional data can be normally achieved even in the variable-speed playback mode.

As described above, there are provided a content providing apparatus, a method of controlling the same, and a recording medium thereof, in which a static compensatory process, i.e. tone mapping based on not dynamic metadata corresponding to each scene but predetermined reference data is performed when dynamic HDR content is played back at a fast speed like a variable-speed playback, so that synchronization between content data and additional data can be normally performed even in a variable-speed playback mode where an image is rapidly changed, thereby having an effect on preventing a user from experiencing visual discomfort due to deterioration in image quality.

The elements of the display apparatus and the content providing apparatus described herein may be implemented using hardware components and software components. For example, the hardware components may include speakers, microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

Although a few embodiments have been shown and described, it will be appreciated that changes may be made in these embodiments without departing from the scope defined in the additional claims.

What is claimed is:

1. A content providing apparatus comprising:
   a transmitter configured to transmit data to a display apparatus; and
   a processor configured to control the transmitter to transmit content data and additional data, relating to image attributes of the content data, to the display apparatus,
   wherein the additional data has a fixed value for performing a tone mapping operation on at least one section, among a plurality of sections of the content data, based on a command received from a user to playback the first section of the image content at a playback speed equal to or higher than a predetermined speed, and
   wherein the additional data has a varied value for performing the tone mapping operation on the at least one section of the content data based on the playback speed being lower than the predetermined speed.

2. The content providing apparatus according to claim 1, wherein the additional data comprises data having the fixed value in the plurality of sections of the content data.

3. The content providing apparatus according to claim 1, wherein the additional data corresponding to a current section, among a plurality of sections of the content data, comprises data having a value corresponding to a previous section, among the plurality of sections of the content data.

4. The content providing apparatus according to claim 1, wherein the additional data comprises identification information for indicating a playback speed of the content data.

5. The content providing apparatus according to claim 1, wherein the additional data is configured to cause the display apparatus to perform a second compensatory process having a processing load less than a first compensatory process on the content data.

6. The content providing apparatus according to claim 5, wherein the additional data comprises information corresponding to the second compensatory process.

7. The content providing apparatus according to claim 5, wherein the first compensatory process comprises a dynamic compensatory process, and the second compensatory process comprises a static compensatory process.

8. The content providing apparatus according to claim 1, wherein the display apparatus, to which the additional data is transmitted, performs a first compensatory process or a second compensatory process having a processing load less than the first compensatory process according to a plurality of sections of the content data, and
   wherein the additional data comprises one of first information corresponding to the first compensatory process and second information corresponding to the second compensatory process according to the plurality of sections of the content data.

9. The content providing apparatus according to claim 8, wherein the first compensatory process comprises a dynamic compensatory process, and the second compensatory process comprises a static compensatory process.

10. The content providing apparatus according to claim 1, wherein the additional data comprises metadata for performing the tone mapping operation on the content data.

11. A method of controlling a content providing apparatus, comprising:
    receiving a command to playback image content at a playback speed; and
    transmitting content data and additional data, relating to image attributes of the content data, to a display apparatus,
    wherein the additional data has a fixed value for performing a tone mapping operation on at least one section, among a plurality of sections of the content data, based on the playback speed being equal to or higher than a predetermined speed, and
    wherein the additional data has a varied value for performing the tone mapping operation on the at least one section of the content data based on the playback speed being lower than the predetermined speed.

12. The method according to claim 11, wherein the additional data corresponding to a current section, among a plurality of sections of the content data, comprises data having a value corresponding to a previous section, among the plurality of sections of the content data.

13. The method according to claim 11, wherein the additional data comprises identification information for indicating a playback speed of the content data.

14. The method according to claim 11, further comprising: performing, by the display apparatus to which the additional data is transmitted, a second compensatory process having a processing load less than a first compensatory process on the content data.

15. The method according to claim 14, wherein the additional data comprises information corresponding to the second compensatory process.

16. The method according to claim 15, wherein the first compensatory process comprises a dynamic compensatory process, and the second compensatory process comprises a static compensatory process.

17. The method according to claim 11, further comprising: by the display apparatus to which the additional data is transmitted, performing a first compensatory process or a second compensatory process having a processing load less than the first compensatory process according to a plurality of sections of the content data,
    wherein the transmitted additional data comprises one of first information corresponding to the first compensatory process and second information corresponding to the second compensatory process according to the plurality of sections of the content data.

18. The method according to claim 17, wherein the first compensatory process comprises a dynamic compensatory process, and the second compensatory process comprises a static compensatory process.

19. The method according to claim 11, wherein the additional data comprises metadata for performing the tone mapping operation on the content data.

20. A non-transitory computer-readable recording medium, in which a program of a method executable by a processor of a content providing apparatus is recorded, the method comprising:
- receiving a command to playback image content at a playback speed; and
- transmitting content data and additional data, relating to image attributes of the content data, to a display apparatus,
- wherein the additional data has a fixed value for performing a tone mapping operation on at least one section, among a plurality of sections of the content data, based on the playback speed being equal to or higher than a predetermined speed, and
- wherein the additional data has a varied value for performing the tone mapping operation on the at least one section of the content data based on the playback speed being lower than the predetermined speed.

* * * * *